United States Patent
Kulkarni et al.

(10) Patent No.: US 12,259,464 B2
(45) Date of Patent: Mar. 25, 2025

(54) RADAR MAP LAYER IN A CROWDSOURCED HD MAP

(71) Applicant: QUALCOMM Incorporated, San Diego, CA (US)

(72) Inventors: Mandar Narsinh Kulkarni, South Plainfield, NJ (US); Jubin Jose, Basking Ridge, NJ (US); Muryong Kim, Madison, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/658,619

(22) Filed: Apr. 8, 2022

(65) Prior Publication Data

US 2023/0324543 A1 Oct. 12, 2023

(51) Int. Cl.
| | | |
|---|---|---|
| *G01S 13/89* | (2006.01) | |
| *G01S 13/58* | (2006.01) | |
| *G06F 18/23* | (2023.01) | |
| *G06F 18/2433* | (2023.01) | |

(52) U.S. Cl.
CPC .......... *G01S 13/89* (2013.01); *G01S 13/581* (2013.01); *G06F 18/23* (2023.01); *G06F 18/2433* (2023.01)

(58) Field of Classification Search
CPC .... G01S 13/89; G01S 13/581; G06F 18/2433; G06F 18/23
See application file for complete search history.

(56) References Cited

U.S. PATENT DOCUMENTS

| | | | |
|---|---|---|---|
| 2020/0081134 A1 | 3/2020 | Wheeler et al. | |
| 2020/0245115 A1* | 7/2020 | Dorrance | H04L 41/142 |
| 2020/0278217 A1 | 9/2020 | Ahmad et al. | |
| 2020/0370920 A1* | 11/2020 | Ahmed | G01S 13/89 |
| 2021/0063200 A1* | 3/2021 | Kroepfl | C03C 17/3644 |
| 2021/0190537 A1 | 6/2021 | Gustafsson et al. | |

(Continued)

FOREIGN PATENT DOCUMENTS

| | | |
|---|---|---|
| CN | 112092803 A | 12/2020 |
| EP | 3637391 A1 | 4/2020 |

OTHER PUBLICATIONS

Costa C.M., et al., "Robust 3/6 DoF Self-localization System with Selective Map Update for Mobile Robot Platforms", Robotics and Autonomous Systems, vol. 76, Oct. 8, 2015, pp. 1-24, XP029377882, ISSN: 0921-8890, DOI: 10.1016/J.ROBOT.2015.09.030, p. 117, Paragraph 2.2.3.

(Continued)

*Primary Examiner* — Peter M Bythrow
*Assistant Examiner* — Nazra Nur Waheed
(74) *Attorney, Agent, or Firm* — QUALCOMM Incorporated

(57) ABSTRACT

Creating and updating an accurate radar map layer for HD map using crowdsourcing may comprise a vehicle obtaining radar data and filtering the radar data on a frame-by-frame basis. In some embodiments, additional filtering may be made on a batch of frames. The vehicle can then transmit the filtered radar data responsive to a determination that a confidence of a position estimate of the vehicle exceeds a conference threshold level and/or a determination that a reliance of the position estimate of the vehicle on the radar data exceeds a reliance threshold level.

41 Claims, 13 Drawing Sheets

(56) References Cited

U.S. PATENT DOCUMENTS

| | | | |
|---|---|---|---|
| 2021/0278523 A1 | 9/2021 | Urtasun et al. | |
| 2022/0277472 A1* | 9/2022 | Birchfield | G06V 10/82 |
| 2023/0184932 A1* | 6/2023 | Leßmann | G01S 13/931 |
| | | | 342/70 |
| 2023/0296756 A1* | 9/2023 | Akbarzadeh | G01S 13/865 |
| | | | 342/195 |

OTHER PUBLICATIONS

Partial International Search Report—PCT/US2023/060908—ISA/EPO—May 10, 2023.

Schumann O., et al., "Scene Understanding With Automotive Radar", IEEE Transactions on Intelligent Vehicles, IEEE, vol. 5, No. 2, Nov. 25, 2019, pp. 1-16, XP011790609, ISSN: 2379-8858, DOI: 10.1109/TIV.2019.2955853, p. 191, Paragraph IV.B.

Ward E., et al., "Vehicle Localization with Low Cost Radar Sensors", IEEE Intelligent Vehicles Symposium, Jun. 19, 2016, pp. 864-870, p. 867, Paragraph III.B.

Huang R., et al., "A High-Precision and Robust Odometry Based on Sparse MMW Radar Data and A Large-range and Long-Distance Radar Positioning Data Set", 2021 IEEE International Intelligent Transportation Systems Conference (ITSC), Sep. 19, 2021, XP033993422, pp. 98-105, Abstract.

International Search Report and Written Opinion—PCT/US2023/060908—ISA/EPO—Aug. 9, 2023.

Ma Y., et al., "Range Sensor Aided Inertial Navigation Using Cross Correlation on the Evidence Grid", Position Location and Navigation Symposium (PLANS), 2012 IEEE/ION, Apr. 23, 2012, XP032200260, pp. 422-427, Abstract.

* cited by examiner

RADAR MAP LAYER IN A CROWDSOURCED HD MAP

BACKGROUND

Vehicle systems, such as autonomous driving and advanced driver-assist systems (ADAS) often use highly accurate 3D maps, known as high definition (HD) maps, to operate correctly. An HD map of a particular region may be downloaded by a vehicle from a server, for example, when the vehicle approaches or enters the region. If a vehicle is capable of using different types of map data, a vehicle may download different "layers" of the HD map, such as a radar map layer, camera map layer, lidar map layer, etc. Ensuring high-quality HD map layers can help ensure that the vehicle operates properly. In turn, this can help ensure the safety of the vehicle's passengers.

BRIEF SUMMARY

Techniques provided herein are directed toward creating and updating an accurate radar map layer for HD map using crowdsourcing. Embodiments include a vehicle obtaining radar data and filtering the radar data on a frame-by-frame basis. In some embodiments, additional filtering may be made on a batch of frames. The vehicle can then transmit, or "publish," the filtered radar data responsive to a determination that a confidence metric of a position estimate of the vehicle exceeds a confidence metric threshold level and/or a determination that a reliance of the position estimate of the vehicle on the radar data exceeds a reliance threshold level.

An example method of obtaining data at a vehicle for a radar layer of a map, according to this disclosure, may comprise obtaining, with a radar at the vehicle, radar data within a geographical region corresponding to at least a portion of the map. The method also may comprise filtering the radar data, wherein the filtering comprises filtering the radar data on a frame-by-frame basis based to remove radar data generated by moving objects. The method also may comprise selectively transmitting the filtered radar data, wherein the transmitting is responsive to: (i) a determination that a confidence metric, indicative of a confidence level of a 6-DOF position estimate of the vehicle, exceeds a confidence metric threshold level; (ii) a determination that a reliance metric, indicative of a reliance level of the 6-DOF position estimate of the vehicle on the radar data, exceeds a reliance metric threshold level; or a combination thereof.

An example radar unit for obtaining data at a vehicle for a radar layer of a map, according to this disclosure, may comprise a radar, a memory, one or more processors communicatively coupled with the radar and the memory, wherein the one or more processors are configured to obtain, using the radar, radar data within a geographical region corresponding to at least a portion of the map. The one or more processors further may be configured to filter the radar data, wherein the filtering comprises filtering the radar data on a frame-by-frame basis to remove radar data generated by moving objects. The one or more processors further may be configured to transmit the filtered radar data, wherein the transmitting is responsive to: (i) a determination that a confidence metric, indicative of a confidence level of a 6-DOF position estimate of the vehicle, exceeds a confidence metric threshold level; (ii) a determination that a reliance metric, indicative of a reliance level of the 6-DOF position estimate of the vehicle on the radar data, exceeds a reliance metric threshold level; or a combination thereof.

An example apparatus for obtaining data at a vehicle for a radar layer of a map, according to this disclosure, may comprise means for obtaining, at the vehicle, radar data within a geographical region corresponding to at least a portion of the map. The apparatus further may comprise means for filtering the radar data, wherein the filtering comprises filtering the radar data on a frame-by-frame basis to remove radar data generated by moving objects. The apparatus further may comprise means for transmitting the filtered radar data, wherein the transmitting is responsive to: (i) a determination that a confidence metric, indicative of a confidence level of a 6-DOF position estimate of the vehicle, exceeds a confidence metric threshold level; (ii) a determination that a reliance metric, indicative of a reliance level of the 6-DOF position estimate of the vehicle on the radar data, exceeds a reliance metric threshold level; or a combination thereof.

According to this disclosure, an example non-transitory computer-readable medium stores instructions for obtaining data at a vehicle for a radar layer of a map, the instructions comprising code for obtaining, with a radar at the vehicle, radar data within a geographical region corresponding to at least a portion of the map. The instructions further may comprise code for filtering the radar data, wherein the filtering comprises filtering the radar data on a frame-by-frame basis to remove radar data generated by moving objects. The instructions further may comprise code for transmitting the filtered radar data, wherein the transmitting is responsive to: (i) a determination that a confidence metric, indicative of a confidence level of a 6-DOF position estimate of the vehicle, exceeds a confidence metric threshold level; (ii) a determination that a reliance metric, indicative of a reliance level of the 6-DOF position estimate of the vehicle on the radar data, exceeds a reliance metric threshold level; or a combination thereof.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
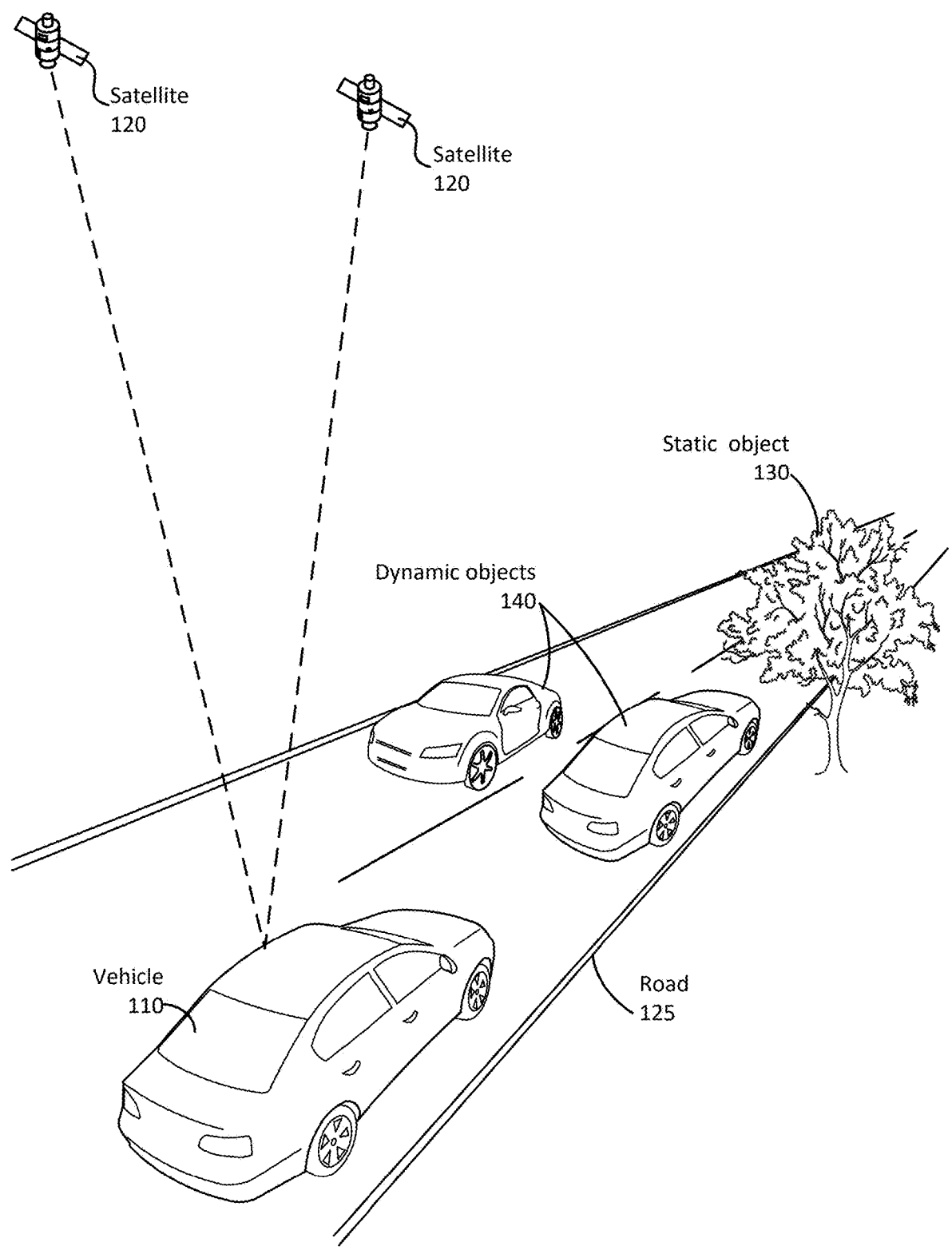
FIG. 1 is a drawing of a perspective view of a vehicle.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. The ensuing description provides embodiment(s) only, and is not intended to limit the scope, applicability, or configuration of the disclosure. Rather, the ensuing description of the embodiment(s) will provide those skilled in the art with an enabling description for implementing an embodiment. It is understood that various changes may be made in the function and arrangement of elements without departing from the scope of this disclosure.

As used herein, the term "position estimate" of a vehicle is an estimation of the location of the vehicle within a frame of reference. This can mean, for example, an estimate of vehicle location on a 2D coordinate frame (e.g., latitude and longitude on a 2D map, etc.) or within a 3D coordinate frame (e.g., latitude, longitude, and altitude (LLA) on a 3D map), and may optionally include orientation information, such as heading. In some embodiments, a position estimate may include an estimate of six degrees of freedom (6-DOF) (also known as "pose"), which includes translation (latitude, longitude, and altitude) and orientation (pitch, roll, and yaw) information.

As used herein, the terms "map," "map data," and derivatives thereof may refer to an electronic representation of a physical location or geographical area. As noted, map data may include different "layers" of different data types, such as radar, camera, etc. As a person of ordinary skill in the art will understand, this electronic representation may be stored in a database or other data structure (in any of a variety of storage mediums) as one or more electronic files, data objects, or the like.

It can be noted that, although embodiments described herein below are directed toward determining the position of a vehicle, embodiments are not so limited. Alternative embodiments, for example, may be directed toward other mobile devices and/or applications in which position determination is made. A person of ordinary skill in the art will recognize many variations to the embodiments described herein.

As previously noted, HD maps can play an important role for autonomous driving systems and advanced driver-assist systems (ADAS). Although these systems may be capable of implementing some solutions using sensors (e.g., a global navigation satellite system (GNSS) receiver and cameras) to provide centimeter-level accuracy without the use of HD maps, such solutions may fail in certain scenarios (tunnels, bad light conditions, rainy or snowy days, urban canyon scenarios, etc.) prohibiting seamless and ubiquitous use of the autonomous driving technology. Thus, the deployment and use of HD maps may play an important role in achieving level L2+ automation and vehicles.

The generation of high-quality HD maps, however, can often be a problem. Simultaneous localization and mapping (SLAM)-based techniques, for example, may be used by vehicle to generate HD maps, but they are limited in quality by the quality of localization achieved. Localization, in turn, depends on quality of the sensors deployed in the vehicle. Further, SLAM-based techniques often result in map data that cannot be used across different types of vehicles. To help ensure compatibility across all vehicle types, and to cover a large geographical regions, fleets of cars with high-quality sensors could be deployed for HD map generation (or "mapping"). But this can be a very expensive solution that may not scale easily. To capture changes to maps (which can happen within minutes or hours), these fleets may need to be deployed continuously.

According to embodiments herein, crowdsourcing techniques may be used in which consumer and/or other vehicles on the road in a geographical region can publish sensor data in raw or processed form to a server in the edge or cloud to enable accurate HD map generation. This HD map can then be used (or "consumed") by the vehicles in the geographical region for their localization objectives. Crowdsourced mapping may be performed in conjunction with positioning at the vehicle. Additional details regarding positioning out of vehicle are provided with regard to FIGS. 1 and 2.

FIG. 1 is a drawing of a perspective view of a vehicle 110, illustrating how crowdsourced mapping by the vehicle 110 generally may be performed, according to embodiments. Here, the vehicle 110 (also referred to as the "ego vehicle") may first determine its position, then use its determined position along with sensors such as cameras and radar to gather information for one or more layers of the HD map.

Positioning may be performed using a GNSS receiver at the vehicle 110 to receive radio frequency (RF) signals transmitted by GNSS satellites 120. (Of course, although satellites 120 in FIG. 1 are illustrated as relatively close to the vehicle 110 for visual simplicity, it will be understood that satellites 120 will be in orbit around the earth. Moreover the satellites 120 may be part of a large constellation of satellites of a GNSS system. Additional satellites of such a constellation are not shown in FIG. 1.) Additionally or alternatively, the terrestrial positioning may be performed using RF signals from terrestrial beacons or transceivers, such as base stations from a cellular communication network. Vehicle sensors and an HD map may also be used to help determine an accurate position of the vehicle 110. (Additional details regarding how these different components can be used for positioning are provided with regard to FIG. 2.) The position of the vehicle 110 may be used for purposes other than mapping, such as vehicle maneuvering, navigation, and so forth.

Figure 2:
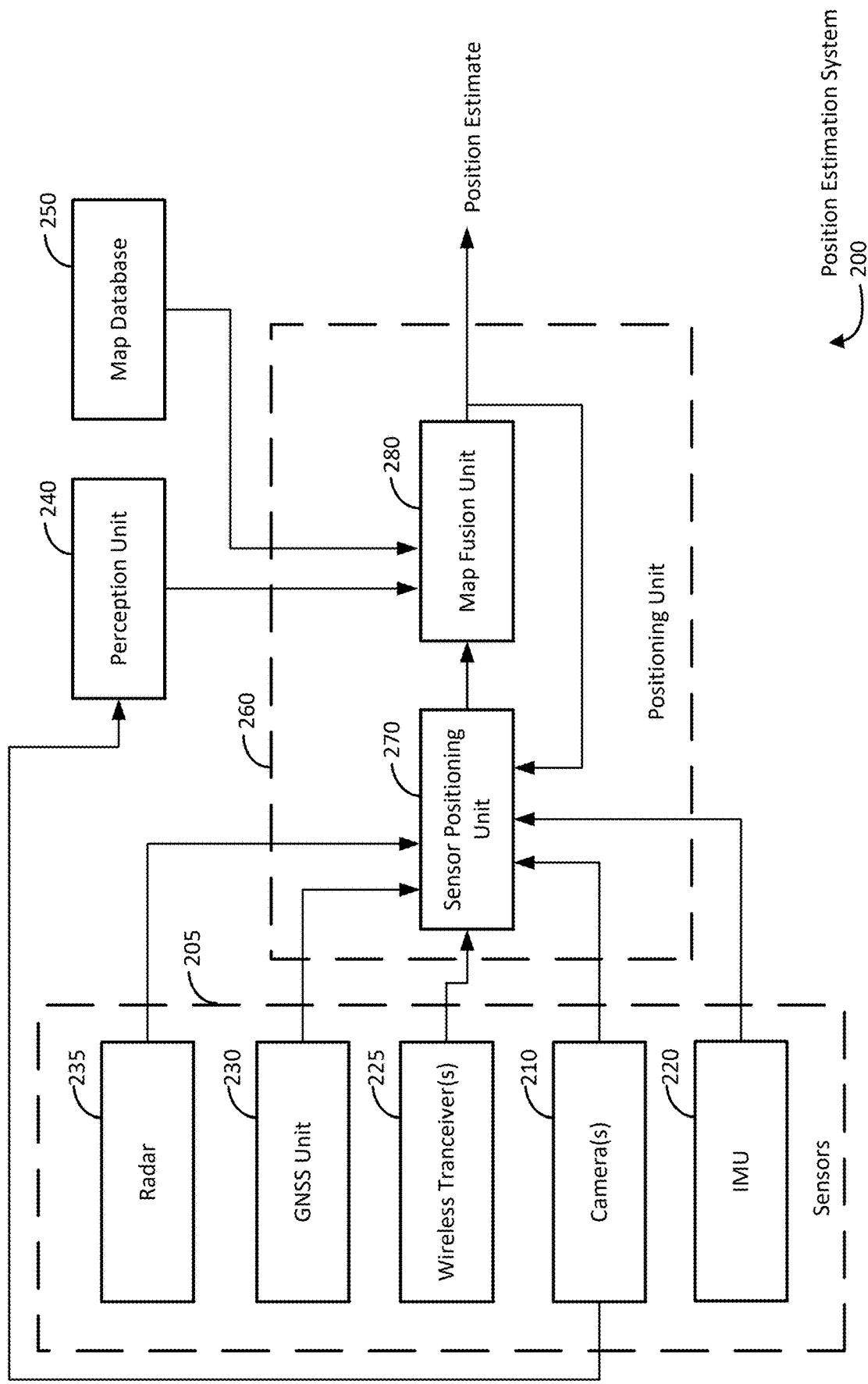
FIG. 2 is a block diagram of a position estimation system, according to an embodiment.

FIG. 2 is a block diagram of a position estimation system 200, according to an embodiment. The position estimation system 200 collects data from various different sources and outputs a position estimate of the vehicle. This position estimate can be used by an automated driving system, ADAS system, and/or other systems on the vehicle, as well as systems (e.g., traffic monitoring systems) remote to the vehicle. Additionally, as noted, the position estimate of the vehicle can be used by a mapping system of the vehicle when performing the techniques for mapping described hereafter. The position estimation system 200 comprises sensors 205 including one or more cameras 210, an inertial measurement unit (IMU) 220, a GNSS unit 230, and radar 235. The position estimation system 200 further comprises a perception unit 240, a map database 250, and a positioning unit 260 comprising a sensor positioning unit 270 and a map fusion unit 280. In alternative embodiments, the components illustrated in FIG. 2 may be combined, separated, omitted, rearranged, and/or otherwise altered, depending on desired functionality. Moreover, in alternative embodiments, position estimation may be determined using additional or alternative data and/or data sources. For example, sensors 205 may include one or more additional or alternative sensors (e.g., lidar, sonar, etc.). One or more components of the position estimation system 200 may be implemented in hardware and/or software, such as one or more hardware and/or software components of the mobile computing system 1200 illustrated in FIG. 12 and described in more detail below. For example, the positioning unit 260 may be implemented by one or more processing units. The various hardware and/or software components that implement the positioning estimation system 200 may be distributed at various different locations on a vehicle, depending on desired functionality.

Wireless transceiver(s) 225 may comprise one or more RF transceivers (e.g., Wi-Fi transceiver, Wireless Wide Area Network (WWAN) or cellular transceiver, Bluetooth transceiver, etc.) for receiving positioning data from various terrestrial positioning data sources. These terrestrial positioning data sources may include, for example, Wi-Fi Access Points (APs) (Wi-Fi signals including Dedicated Source Range Communications (DSRC) signals), cellular base stations (e.g., cellular-based signals such as Positioning Reference Signals (PRS) or signals communicated via Vehicle-to-Everything (V2X), cellular V2X (CV2X), or Long-Term Evolution (LTE) direct protocols, etc.), and/or other positioning sources such as road side units (RSUs), etc. Wireless transceiver(s) 225 also may be used for wireless communication (e.g., via Wi-Fi, cellular, etc.), in which case wireless transceivers 225 may be incorporated into a wireless communication interface of the vehicle.

The GNSS unit 230 may comprise a GNSS receiver and GNSS processing circuitry configured to receive signals from GNSS satellites (e.g., satellites 120) and GNSS-based positioning data. The positioning data output by the GNSS unit 230 can vary, depending on desired functionality. In some embodiments, the GNSS unit 230 may provide, among other things, a three-degrees-of-freedom (3-DOF) position determination (e.g., latitude, longitude, and altitude). Additionally or alternatively, the GNSS unit 230 can output the underlying satellite measurements used to make the 3-DOF position determination. Additionally, or alternatively, the GNSS unit can output raw measurements, such as pseudo-range and carrier-phase measurements.

The camera(s) 210 may comprise one or more cameras disposed on or in the vehicle, configured to capture images, from the perspective of the vehicle, to help track movement of the vehicle. The camera(s) 210 may be front-facing, upward-facing, backward-facing, downward-facing, and/or otherwise positioned on the vehicle. Other aspects of the camera(s) 210, such as resolution, optical band (e.g., visible light, infrared (IR), etc.), frame rate (e.g., 30 frames per second (FPS)), and the like, may be determined based on desired functionality. Movement of the vehicle 110 may be tracked from images captured by the camera(s) 210 using various image processing techniques to determine motion blur, object tracking, and the like. The raw images and/or information resulting therefrom may be passed to the sensor positioning unit 270, which may perform visual inertial odometry (VIO) using the data from both the camera(s) 210 and the IMU 220.

IMU 220 may comprise one or more accelerometers, gyroscopes, and/or (optionally) other sensors, such as magnetometers, to provide inertial measurements. Similar to the camera(s) 210, the output of the IMU 220 to the sensor positioning unit 270 may vary, depending on desired functionality. In some embodiments, the output of the IMU 220 may comprise information indicative of a 3-DOF position or 6-DOF pose of the vehicle 110, and/or a 6-DOF linear and angular velocities of the vehicle 110, and may be provided periodically, based on a schedule, and/or in response to a triggering event. The position information may be relative to an initial or reference position. Alternatively, the IMU 220 may provide raw sensor measurements.

The radar 235 may comprise one or more radar sensors disposed in or on the vehicle. Similar to the camera(s) 210, radar may be front-facing, upward-facing, backward-facing, downward-facing, and/or otherwise positioned on the vehicle to gather information regarding the vehicle's surroundings. According to some embodiments, a radar may scan an area or volume near the vehicle at a rate of once every second or more, or several times per second (e.g., 5, 10, 20, 50, or 100 times per second, for example), and this scan rate may be dynamic, depending on sensor capability, processing capabilities, traffic conditions, etc. Radar scans may also be referred to herein as "frames." Radar can complement other sensors to help provide robust autonomous features. For example, enabling autonomous driving in true sense may require robust solutions for localization in all types of weather and environmental conditions, such that a vehicle knows its pose within few centimeters. Just like human eye, lidar and camera cannot see during night times or when there is too much fog in the surroundings. Global positioning sensors like GNSS may not be available in underground, or tunnel scenarios and may be challenged in urban canyon scenarios. In some embodiments, radar sensors may utilize lower frequencies, for instance using millimeter wave (mmWave) radar (e.g., having frequencies in the range of 30 GHz-300 GHz), for enabling sub-meter-level accuracy localization in such challenging scenarios.

The sensor positioning unit 270 may comprise a module (implemented in software and/or hardware) that is configured to fuse data from the sensors 205 to determine a position of the vehicle. As noted, the sensor positioning unit 270 may perform VIO by combining data received from the camera(s) 210 and IMU 220. The sensor positioning unit 270 may utilize data from the GNSS unit 230, radar 235, and/or wireless transceiver(s) 225 in addition or as an alternative to VIO data to determine a position of the vehicle and/or modify a determined position of the vehicle. In some embodiments, data from different sensors may be given different weights based on input type, a confidence metric (or other indication of the reliability of the input), and the like. Generally put, sensor positioning unit 270 may output an estimated position of the vehicle based on received inputs. Depending on the accuracy of the received inputs (e.g., accuracy of the data from the sensors 205, the output of the sensor positioning unit 270 may comprise highly-accurate vehicle position estimate in a global frame (or other reference frame) to the map fusion unit 280.

The map fusion unit 280 works to provide a vehicle position estimate within a map frame, based on the position estimate from the sensor positioning unit 270, as well as information from a map database 250 and a perception unit 240. The map database 250 can provide a 3D map (e.g., a high definition (HD) map in the form of one or more electronic files, data objects, etc.) of an area in which the vehicle 110 is located, and the perception unit 240 can make observations of lane markings, traffic signs, and/or other visual features in the vehicle's surroundings. To do so, the perception unit 240 may comprise a feature-extraction engine that performs image processing and computer vision on images received from the camera(s) 210. In some embodiments, the perception unit 240 may further operate using input from radar 235 and/or other sensors (e.g., lidar).

As previously noted, the position estimate provided by the map fusion unit 280 (i.e., the output of the positioning unit 260) may serve any of a variety of functions, depending on desired functionality. For example, it may be provided to autonomous driving, ADAS, and/or other systems of the vehicle 110 (and may be conveyed via a controller area network (CAN) bus), communicated to devices separate from the vehicle 110 (including other vehicles; servers maintained by government agencies, service providers, and the like; etc.), shown on a display of the vehicle (e.g., to a driver or other user for navigation or other purposes), and the like. The position of the vehicle may additionally be used by the vehicle to perform crowdsourced mapping according to embodiments herein.

Referring again to FIG. 1, as the vehicle 110 travels within a geographical region corresponding to an area of the HD map, the vehicle 110 use different sensors (e.g. sensors 205) to gather information for different corresponding map layers of the HD map. For example, one or more cameras (e.g., camera(s) 210) can be used to gather information for a camera map layer, radar (e.g., radar 235) can be used to gather information for a radar map layer, lidar may be used to gather information for a lidar map layer, and so forth. Map layer information may not only be gathered regarding a road 125 on which the vehicle 110 is traveling (e.g., lane boundary information, road curvature, road hazards, etc.) but also static objects 130 in or near the road 125. (Although the static object in FIG. 1 is illustrated as a tree, other static objects may comprise traffic signs, sidewalks, traffic lights, mile markers, etc.) As described in further detail hereafter, map layer information may also filter out dynamic objects 140. Dynamic objects may generally include moving objects such as other vehicles, pedestrians, bicyclists, etc.

As previously noted, radar can be complementary to other sensors and/or map layers and useful for autonomous driving and other features. Additionally, vehicle localization in a global coordinate frame may require a HD map built a priori. This is because scan-to-scan matching, as is done for lidar, may not be feasible with radar due to sparsity of point cloud. Thus, a prior-built HD radar map layer may be needed, which can be done using localization or SLAM. Developing and maintaining the HD radar map layers may therefore play an important role in enabling radar localization. Embodiments described herein provide for the development and maintenance of such HD radar map layers.

Figure 3:
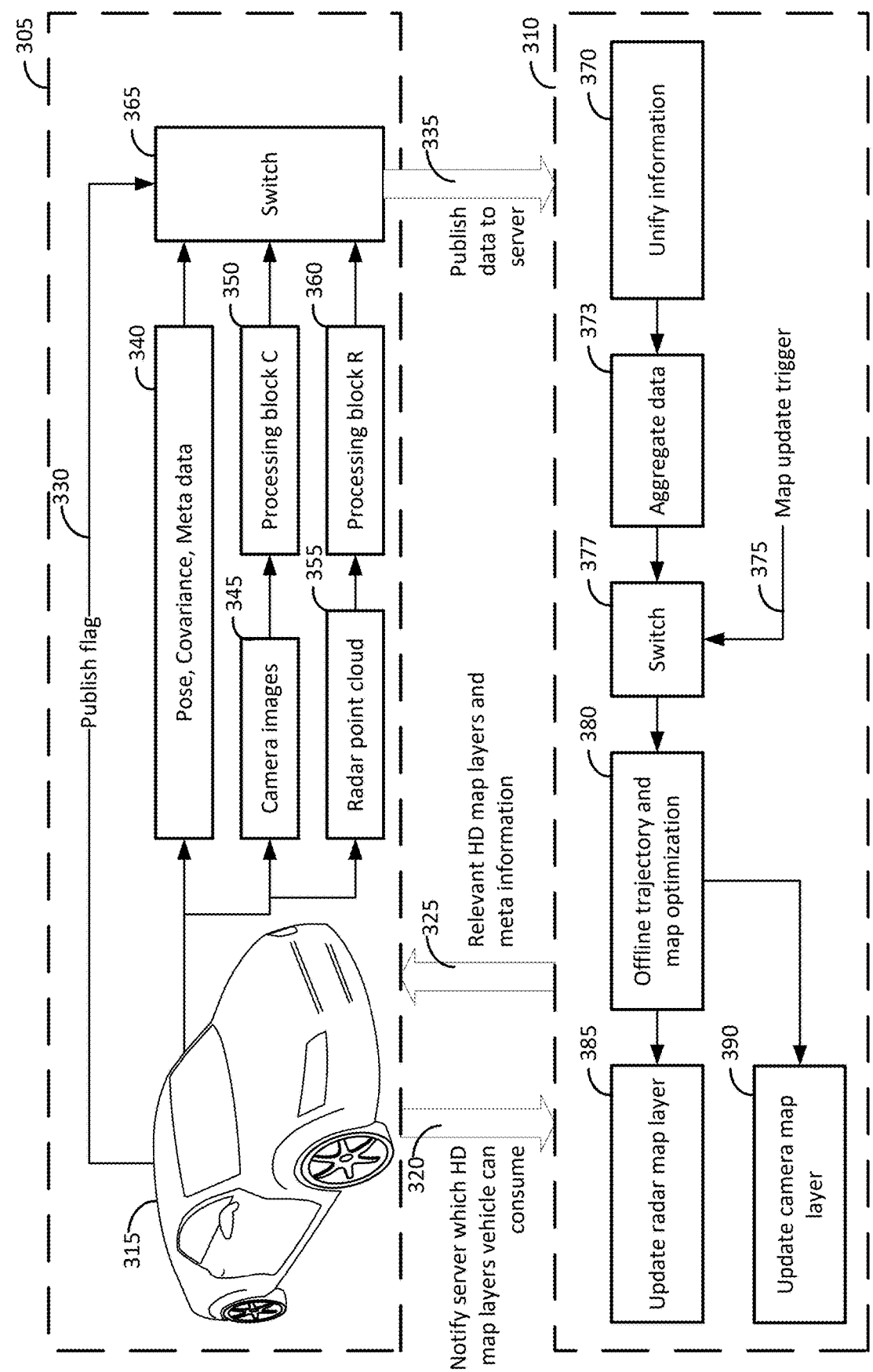
FIG. 3 is a block diagram of a method of obtaining radar and camera data for radar and camera map layers of an HD map, according to an embodiment.

FIG. 3 is a high-level block diagram of a method of obtaining radar and camera data for radar and camera map layers of an HD map for a geographical region, according to an embodiment. The functionality illustrated in block 305 may be performed by a vehicle, and the functionality illustrated in block 310 may be performed by a server (e.g., a cloud/edge server). Alternative embodiments may distribute functionality differently between vehicle and server. Additionally, although both camera and radar map layers are described, some embodiments may include only a radar layer, rather than both. Further, to enable generation and maintenance of and HD map of a geographical region, many vehicles may each perform the functionality at block 305 simultaneously and/or at different times while in the geographical region. The functionality illustrated in block 305 may be performed by a computing system of a vehicle, such as the mobile computing system 1200 illustrated in FIG. 12 and described hereafter. Further, the mapping functionality illustrated in FIG. 3 may be performed in conjunction with positioning in FIG. 2. In particular, the position estimate of the position estimation system 200 of FIG. 2 and/or radar data collected by radar 235 of FIG. 2 may be used, in part, to gather radar and position data as used in block 305 and described hereafter. Further, the functionality in block 310 may be performed by one or more computer systems, such as the computer system 1200 illustrated in FIG. 12. Communication between the vehicle 315 and server may be facilitated via a wireless communication network (e.g., a cellular/mobile communication network and/or similar Wireless Wide Area Network (WWAN)).

The method may begin with the functionality shown at arrow 320, in which the vehicle 315 sends a notification to the server regarding its current location along with an indication of which HD map layers the vehicle 315 can consume. The current location may be a rough location estimate (e.g., within tens of meters) or precise location estimate, and may be based on GNSS information and/or a position estimate as described with regard to FIG. 2. The vehicle 315 may be capable of consuming HD map layers corresponding with vehicle sensors. For example, if the vehicle 315 comprises radar, cameras, and lidar, it may be capable of consuming radar, camera, and lidar HD map layers. The vehicle 315 may further indicate this capability of consuming radar, camera, and lidar HD map layers into the notification sent at arrow 320. The vehicle 315 may send the notification based on different triggering events, such as entering or coming within a threshold distance of a geographical region of an HD map, determining a navigation route that enters the geographical region, exiting or coming within a threshold distance of a boundary of a previously-downloaded HD map, communicating with a cellular base station (or other wireless network access point) within the geographical region, or the like.

The format and content of HD map layers may vary, depending on desired functionality. An example radar map layer may comprise, for example, a 2D or 3D static occupancy grid (SOG) representation of the environment. An example camera map layer may comprise data indicative of 3D traffic signs, lane boundaries, and/or other features captured by vehicle cameras. Additional details regarding radar and camera map layers are provided hereafter. HD maps may comprise subregions, or "tiles." Further, HD maps and/or tiles may vary in size (e.g., a 1 km×1 km region, 5 km×5 km region, etc.) and resolution.

The server may then respond as indicated at arrow 325, in which the relevant HD map layers and meta information is provided by the server to the vehicle 315. If the requested HD map is incomplete or unavailable, the server may send a notification to the vehicle 315 that requested map layers are unavailable. The meta information, provided by the server along with the HD map layers, may comprise information about the HD map and map layers, including region descriptions (e.g., tile indicators) of regions/layers to be updated and/or region descriptions of regions/layers that do not need updating. Additionally or alternatively, metadata may indicate that certain regions (tiles) in the HD map have a higher confidence (e.g., of data accuracy) than others. This meta information therefore may be useful as one of the criteria for the vehicle 315 to determine whether to publish captured camera and/or radar data, which may be reflected in the publish flag 330 (described hereafter). In an example implementation, for regions in which the server notifies the vehicle 315 that map updates are not needed, the vehicle 315 does not publish any radar-camara data to the server. In other regions, the vehicle 315 may publish the data as illustrated at arrow 335 if other criteria are satisfied. (The publication of data is described hereafter.)

After receiving the HD map layers, the vehicle 315 may perform the functions illustrated in block 305. In particular, the vehicle 315 can use the HD map layers for generating pose estimates of the vehicle 315 and enabling autonomous driving (e.g., as described with regard to FIG. 2). (A more specific description of how an HD radar map layer may be consumed for localization is provided hereafter.) Further, the vehicle 315 can then prepare data to be published to the server. As indicated at block 340, the vehicle 315 may then determine its pose estimate along with covariance and related meta data. This meta data may comprise, for example, a grade of sensor quality deployed on the vehicle. Additionally, camera images may be collected as shown at block 345 and processed as shown at block 350 to compress/filter camera data. The processing of camera images may be referred to herein as processing block C, as shown in FIG. 3. Similarly, radar data may be captured, as indicated at block 355 (radar point cloud) and processed as indicated at block 360 (processing block R). The processing of radar data may be referred to herein as processing block R, as shown in FIG. 3. The switch 365 may comprise a logical block that publishes the metadata, processed camera data, and processed radar data to the server (as shown at arrow 335) if the publish flag 330 is ON (i.e., activated). Again, the criteria for the publish flag 330 to be ON is described hereafter. In some embodiments, the published data may additionally include semantic information (e.g., annotations) regarding the metadata, processed camera data, processed radar data, and/or other information related to the capture and/or processing of the data. Further, as noted below, processed camera data and/or processed radar data may comprise differential information from the respective HD camera and/or radar map layers, to help reduce the bandwidth of the published information.

The types of processing performed by processing blocks C and R (shown at blocks 350 and 360) may vary depending on desired functionality. Processing block R, for example, can involve filtering out false detections, removing dynamic obstacles, removing data when vehicle velocity is below a threshold, etc. in some embodiments, an objective of processing block R may be to reduce the volume of the data to be published to the server by removing unwanted information from the raw point cloud. Processing block R may also involve radar perception tasks, for instance identifying features from radar point cloud data. The features involve clustering point clouds into clusters representing 2D or 3D geometric shapes like straight line or circle in 2D, or cuboid in 3D. The features may also have semantic meaning like guard rails, traffic signs, etc. Processing block R may also involve aggregating radar point cloud across multiple frames with respect to a common reference frame using relative pose change estimates across the frames. Processing block C may involve generating a 3D local map data by identifying key points on the image (e.g., traffic sign detections, poles, guard rails, road boundaries, lane markers, etc.), triangulating these key points to 3D map features using, for example, a structure from motion methodology, and publishing these triangulated features to the cloud in certain circumstances when the publish flag 330 is ON. Additional descriptions regarding processing are provided hereafter with respect to FIGS. 5 and 6.

Once the server receives the published data, the server may then perform the operations illustrated in block 310. These operations may include performing the functionality illustrated at block 370, where the server unifies information received from multiple vehicles. As noted, the server may be communicatively coupled with many vehicles in a particular geographical region. Using the functionality illustrated in block 305, each of these vehicles may publish information to the server. However, the sensor types and specifications may differ between vehicles, resulting in sensor data having different coordinate information, scale, format, etc. Thus, the unification performed at block 370 may comprise unifying this data to a common coordinates system, scale, format, etc.

At block 373, the server may then aggregate the data, storing data published by multiple vehicles over window of time. The server may continue to aggregate this data until receiving an update trigger, as shown by arrow 375. Depending on desired functionality, the trigger may cause the server to aggregate data across a periodic window of time and/or until a certain event occurs. The map update trigger may therefore comprise a periodic trigger (e.g., once every six hours, once every 12 hours, once every day, etc.) and/or an event-based trigger (e.g., based on a determination that the quality of an HD map layer is below a threshold and needs to be updated, based on input received from one or more vehicles, etc.).

In response to the map update trigger activating a switch 377 (e.g., a logical switch), the server can then process the aggregated data to determine off-line trajectory and map optimization, as indicated at block 380. Details regarding how this may be performed are provided hereafter. This results in newly-optimized radar and camera map layer information, which can be used to update the radar map layer as shown at block 385 and/or update the camera map layer as shown at block 390. More specifically, because the newly-optimized radar and camera map layer information generated at block 380 may be for a portion (e.g., a neighborhood of a city) of a larger/global HD map (e.g., of a city, state, country, etc.), the updating performed at block 385 and 390 may comprise updates to the larger/global HD map layers with the newly optimized radar and camera map layers.

As noted, radar and camera map layers of an HD map may vary in format and content. For example, a camera map layer of the HD map may comprise a feature-based map that includes 3D features such as traffic signs, poles, guard rails, other road boundaries, lane markers, etc. According to some embodiments, traffic sign in the camera map layer may be described by a 3D bounding box around the sign. Guard rails or road boundaries may be defined, for example, using cubic splines or the like. According to some embodiments, the radar map layer may comprise a 2D static occupancy grid map of the environment. The occupancy grid may be described as "static" because it may include only static obstacles (e.g., static object 130 of FIG. 1) detected by the radar, while omitting dynamically moving obstacles (e.g., dynamic objects 140). According to some embodiments, the space over which the radar map layer is to be defined may be discretized into a grid and each grid (i,j) may be associated with a unique occupancy probability. Each grid cell also may be associated with other flags like height of the terrain at (i,j) or timestamp of last update, etc. additional details regarding a 2D grid format are provided hereafter with regard to FIG. 9. For large regions, radar map layers may be sparse, in which case it may be inefficient to store the map layers in 2D grid format. In such cases and/or in some embodiments, a radar map layer may comprise a sparse matrix representation like coordinate list or compressed row, which may be more efficient ways in which to store radar map layers by the server (or elsewhere in the edge/cloud) and for communicating radar map layer information between the server and the vehicle.

Figure 4:
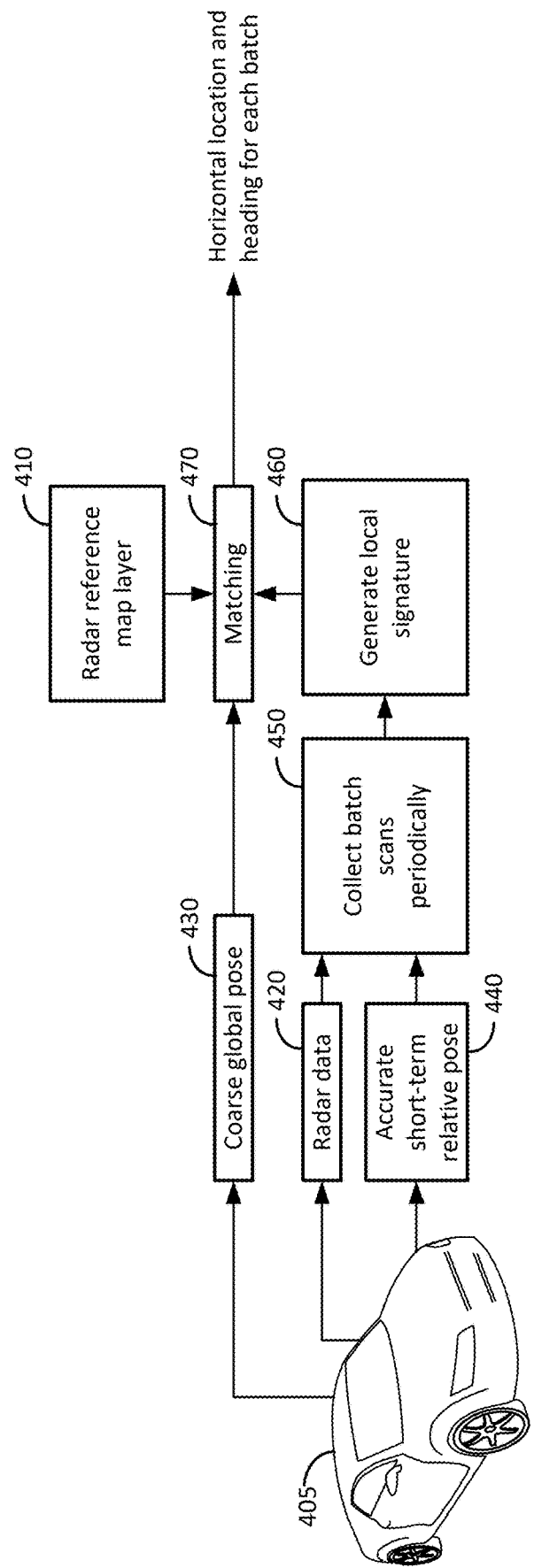
FIG. 4 is a high-level concept diagram illustrating how a vehicle may perform radar localization, according to some embodiments.

FIG. 4 is a high-level concept diagram illustrating how a vehicle 405 may perform radar localization, according to some embodiments. This may be performed by hardware and/or software components of a vehicle, as shown, for example, in FIGS. 2 and 12. In conjunction with the method illustrated in FIG. 3, for example (and thus, vehicle 405 of FIG. 4 may correspond to the vehicle 315 of FIG. 3) and/or while performing position estimation as described with respect to FIG. 2. At block 410, the vehicle 405 may download a reference radar map layer from a server, where the reference radar map layer may comprise the radar map layer of the HD map downloaded in FIG. 3 at arrow 325. To perform radar localization, the vehicle 405 may collect radar data, as shown at block 420. This radar data may comprise, for example, a 2D radar point cloud (i.e., X-Y coordinates of point targets). Additionally, the vehicle 405 may obtain a coarse global pose (e.g., 6 degrees of freedom (6-DOF)), as shown at block 430, and relative pose change between every time epoch for which radar point cloud is collected and linear and angular velocity of the vehicle every time radar data was collected, as shown at block 440. As indicated at block 450, a batch is formed using all this data, wherein all the radar data in a batch interval (e.g., between 0.2 and 5 seconds) is transformed to a common coordinate origin using the relative pose. The duration interval could be fixed or variable. An example of variable batch interval is as follows. If the vehicle is heading into a tunnel as seen by a camera, or based on current localization of a vehicle on a map, the reliance on radar localization can be high on the overall ego localization and thus the batch duration interval could be set to be high to get good accuracy with radar localization. A batch of radar data may then be converted to a local radar signature, as indicated at block 460. This local radar signature may comprise, for example, a local radar map or simply an accumulation of point cloud data. Finally, as shown by block 470, a matching algorithm can be used to compare the local radar signature (produced at block 460) with the reference radar map layer (obtained/downloaded at block 410), enabling the determination an X-Y location estimate for the vehicle 405 in space with respect to a global reference frame and the vehicle's heading direction.

Different algorithms for matching performed at block 470 may be performed, including industry known matching techniques such as map2map and scan2map algorithms. In the succeeding discussion, bold parameters are vectors/matrices and other variables are scalars. In these algorithms, the vehicle (ego) pose estimate at time k can be defined as $x_k$, where $x_k$ is vector capturing the location in a fixed reference frame along with orientation information in 2D or 3D. Radar measurements may then be used to obtain a refined pose estimate given an initial coarse pose estimate at time k, which can be defined as $\widetilde{x_k}$. The downloaded radar reference map layer may be denoted by m, where m is a convenient vector or matrix representation of the map. For a 2D radar point cloud, a pose may be given by vector (x, y, θ), where θ is the yaw angle with respect to up-frame, and X-Y coordinates (x, y) may be provided in meters with respect to an East-North-Up (ENU) frame, which can be defined as F Further, radar measurements and relative pose change at time k can be defined, respectively, as $z_k$ and $u_k$. Radar measurements $z_k$ itself may contain several point targets detected by radar in polar coordinates with respect to the radar location (which may not be in a fixed global frame). Here $z_{1:k}$ is a collection of measurements $\{z_1, \ldots, z_k\}$. The relative pose $u_k$ is described as (x, y, θ) with respect to previous pose $x_{k-1}$. The radar measurements $z_k$ are first filtered to remove dynamic obstacles, and false targets. Details of the preprocessing are provided hereafter with respect to FIG. 5. Estimated quantities may be denoted with a hat ($\hat{}$). Variables with bold letters are vectors, and the rest are scalars. The term p(A|B) indicates conditional probability of event A given event B.

Given those definitions, map2map matching may be performed as follows. The radar measurements over τ time indices first may be aggregated to form a local map $m_l$. This map may comprise an SOG, as previously described. The following maximization offers a map2map matching solution to the radar localization problem:

$$\widehat{x_k} = \operatorname{argmax}_x p(m_l | x, m) \quad (1)$$

For a given yaw angle, this conditional probability can be approximated using the normalized cross correlation metric to enable image registration of two SOGs. An exhaustive search over yaw angles with uniform spacing can be done and the above maximization can be solved for each potential yaw angle. The best pose can be chosen for the yaw angle that leads to higher value of the conditional probability.

For Scan2map matching, given ground truth relative pose change $u_{1:\tau}$ during a batch interval, all the measurements $z_{1:\tau}$ may be assumed to be relative positions of radar targets with respect to the radar pose in ENU frame at time index 1 without loss of generality (relative pose change in the batch is used to enable such transformation and no/little error in relative pose during the batch is assumed). Scan2map matching solves the following problem $$\widehat{x_1} = \operatorname{argmax}_x p(z_{1:\tau} | x, m). \quad (2)$$

The following model may be used to compute the likelihood probability. The list $m_1, \ldots, m_O$ comprises a list of all occupied cells in map m. Here, $m_i = [m_{i,x}, m_{i,y}]$, where the X-Y coordinates are with respect to the ENU frame F Measurements at time k may be defined as $z_k = [z_k^1, \ldots, z_k^{N_k}]$, where each measurement $z_k^i = [r_k^i, \phi_k^i]$ indicating the range and bearing (yaw angle) of that measurement with respect to the ego position of the radar. Feature correspondence may be denoted by $c_k^i = j$, $c_k = [c_k^1, \ldots, c_k^{N_k}]$, and $x_k = [x, y, \theta]$. For every $1 \le i \le N_k$, a popular measurement model may be:

$$z_k^i = \begin{bmatrix} \cos\theta & -\sin\theta \\ \sin\theta & \cos\theta \end{bmatrix} \begin{bmatrix} m_{c_k^i, x} & -x \\ m_{c_k^i, y} & -y \end{bmatrix} + n_k^i, \quad (3)$$

where $n_k^i$ is zero mean with covariance $Q_k^i$. The noise may be assumed to be independent across i, k Given this measurement model, the scan2map matching problem may be reformulated as indicated below. If the noise covariance matrix is identity times a scalar, the problem of finding optimal association/correspondence can be shown to be equivalent to minimum distance association when measurement points are projected on the map with a common anchor reference frame. Under these assumptions, the scan2map matching problem can be simplified to minimizing $\tau d_i^2$ over different points i in radar point cloud and $d_i$ is the distance of the point to closest occupied cell in the map. Note that different pose $x_1$ leads to different distances as the correspondence changes.

In alternative embodiments of scan2map matching, the minimization may comprise a weighted minimization where the weights correspond to different noise characteristics at different times in a batch (to account for drift in accumulating the radar points into a batch using the relative pose).

Scan2map matching may not always work well if the number of points in the scan is small. In these conditions, radar localization may be assumed not to be possible if the number of points in a scan is less than a threshold. Similarly, for map2map matching, if the number of occupied cells in a local map $m_l$ is less than a threshold then, map2map matching may be assumed not to work. Similar to a threshold on total number of points in scan or occupied cells in local map, there can be additional checks on shape of the scan/local map for identifying preemptively if the matching will likely not work. For instance, a straight line could be fit to the point cloud in scan or occupied cells in local map and, if the residual of line fitting is small, it may imply the radar detections are primarily for a road boundary that is straight. In this case, the matching may not perform well. If the fitting is not good, it may be a good sign that there is enough shape diversity.

The determination of whether a vehicle publishes data to the server (e.g., whether the publish flag 330 of FIG. 3 is ON) can be made based on one or more different factors. For example, for a server that is accepting new data for one or more map layers of a region (e.g., tile) of an HD map, the publish flag may be ON for the vehicle if a confidence metric, indicative of a level of confidence of a 6-DOF (X-Y-Z position and 3D orientation) position estimate, is above a threshold and/or when the server indicates that there is heavy reliance on radar localization for vehicles running in the region (e.g., other positioning data such as GNSS/camera/lidar may be less accurate and/or reliable). Thus, the ability of the vehicle to suggest that publish flag is ON or not may depend on the vehicle's ability to identify two items of information.

The first item of information is a confidence metric on its localization performance. This may be determined, for example, based on the covariance matrix of the pose. An example to identify good localization performance could be that for each 6-DOF in ego pose state has standard deviation which is less than a particular threshold. An indirect way to identify bad localization performance is to identify some events when the positioning engine usually faces challenges. For instance, if camera detects bad lighting conditions or fog in which case the localization engine may not perform well and data not worth publishing to the server for map creation/maintenance.

The second item of information is a heavy reliance on radar localization. The localization performance from individual components—GNSS, radar, camera, etc.—can be compared to the outcome of final ego pose estimated by the vehicle to identify if there is heavy reliance (e.g., above a threshold) on a particular sensor and in this case whether radar localization has heavy reliance. For instance, an output pose of a radar-only mode may be defined as $\ell_{radar} \in R^3$, an output pose of a camera+GNSS mode may be defined as $\ell_{cam,GNSS} \in R^3$, and a final output pose of the localization engine using all sensors may be defined as $\ell \in R^3$. If $$\frac{|\ell - \ell_{radar}|^2}{|\ell - \ell_{cam,GNSS}|^2} < \alpha$$

it may be concluded that heavy reliance has been given to radar localization (and radar data may be published). Here, $|\cdot|$ may compute L2 norm. An indirect way is to identify events that lead to bad GNSS or camera localization performance. For instance, in urban canyon setups with lot of traffic where GNSS is poor and/or lane markers may not be clearly visible.

It can be noted that, although previously-described embodiments indicate how the vehicle may publish radar map layer data to a server, embodiments are not limited. That is, although the use of a server (e.g., edge or cloud server) can help ensure centralized development of an HD map to share with consumers in a geographical region corresponding to the HD map, some embodiments may enable vehicles to share radar data or other meta data (like heavy reliance on radar localization or a confidence metric of localization performance (e.g., radar localization success)) with other vehicles and/or devices. For example, a "host" vehicle may be communicatively coupled with one or more additional vehicles that provide radar data to the host vehicle rather than a server. (In these instances, the additional vehicles may be in direct communication with a host vehicle but may not be able to communicate with a server, whereas the host vehicle may be able to do so.) Further, in some embodiments, the host vehicle may perform some or all of the functionality of the server (e.g., as shown in block 310 of FIG. 3), including updating HD map layers and/or sharing them with other vehicles. The host vehicle may further upload radar map data to a server, according to some embodiments.

Figure 5:
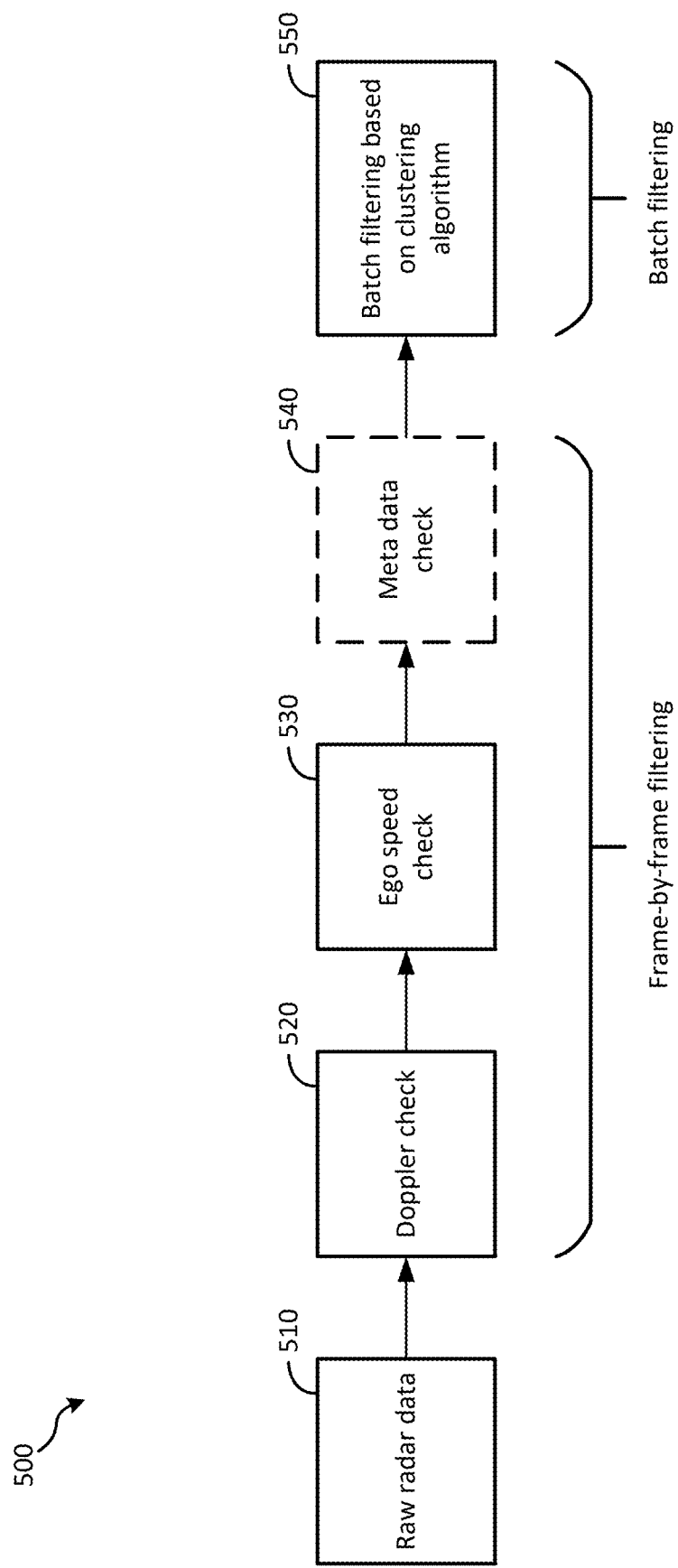
FIG. 5 is a diagram illustrating a method by which radar data may be preprocessed to reduce the volume of radar data, according to an embodiment.

FIG. 5 is a diagram illustrating a method 500 by which radar data may be preprocessed to reduce the volume of radar data, according to an embodiment. This process may be performed, for example, at block 360 (processing block R) of FIG. 3. At block 510, raw radar data is collected at the vehicle using one or more radar sensors. As previously noted, radar data may contain data from stationary and moving detected objects, or "targets" (e.g., static object 130 and dynamic objects 140), as well as potentially ghost targets (i.e., targets which do not actually exist but are detected by the radar owing to abnormalities in beam shapes or multipath effects). Moreover, not all targets may be beneficial for generating radar signatures in form of maps (or any other form). It can be helpful, for instance, to include static targets while removing dynamic targets and ghost targets to be able to reproduce radar signatures whenever the vehicle goes through the same region another time.

To remove these unwanted targets, the method 500 includes frame-by-frame filtering and batch filtering. Frame-by-frame filtering may comprise a Doppler check 520, ego speed check 530, and metadata check 540 (which is optional, as indicated by dashed lines). Batch filtering may comprise batch filtering based on a clustering algorithm 550. It can be noted that some embodiments may not perform the functionality of all of the blocks illustrated in FIG. 5 and/or may not necessarily perform the operations in the order shown. That said, embodiments employing batch filtering may perform batch filtering after frame-by-frame filtering operations are completed. To identify and remove moving targets, Doppler check 520 and ego speed check 530 may be performed on a per-frame basis, which can filter out unwanted or noisy points. As a person of ordinary skill in the art may appreciate, Doppler check 520 may perform better filtering of moving objects at higher speeds, whereas ego speed check 530 may perform better filtering of moving objects at lower speeds. The optional metadata check 540 may comprise a check of certain metrics (e.g., signal to noise ratio (SNR), radar cross-section (RCS), specific indicators on multipath targets, and the like) to determine a reliability of the radar data and filter out data failing to meet a minimum threshold.

Doppler check 520 may be performed, for example, by estimating radial velocity of detected targets in the environment and comparing the detected velocity of point targets with the theoretical velocity of stationary targets, given the speed of the vehicle. For example, if the ego speed of the radar mounted on the vehicle is v, and the radar is mounted on the vehicle with yaw angle (with respect to heading direction) equal to $\phi$ then the expected Doppler velocity of targets at azimuth angle $\theta$ is v $\cos(\theta+\phi)$. Since usually the vehicle velocity will not be measured at the radar itself, but at some other fixed frame on the vehicle, the measured velocity of the vehicle may need to be transformed to the radar frame using linear and angular velocity of the vehicle measured at the fixed frame. The Doppler check 520 may be implemented by filtering out all the targets with reported Doppler velocity which is outside v $\cos(\theta+\phi)\pm\in$m/s interval. A typical value of E could be less than 1 m/s.

Figure 6:
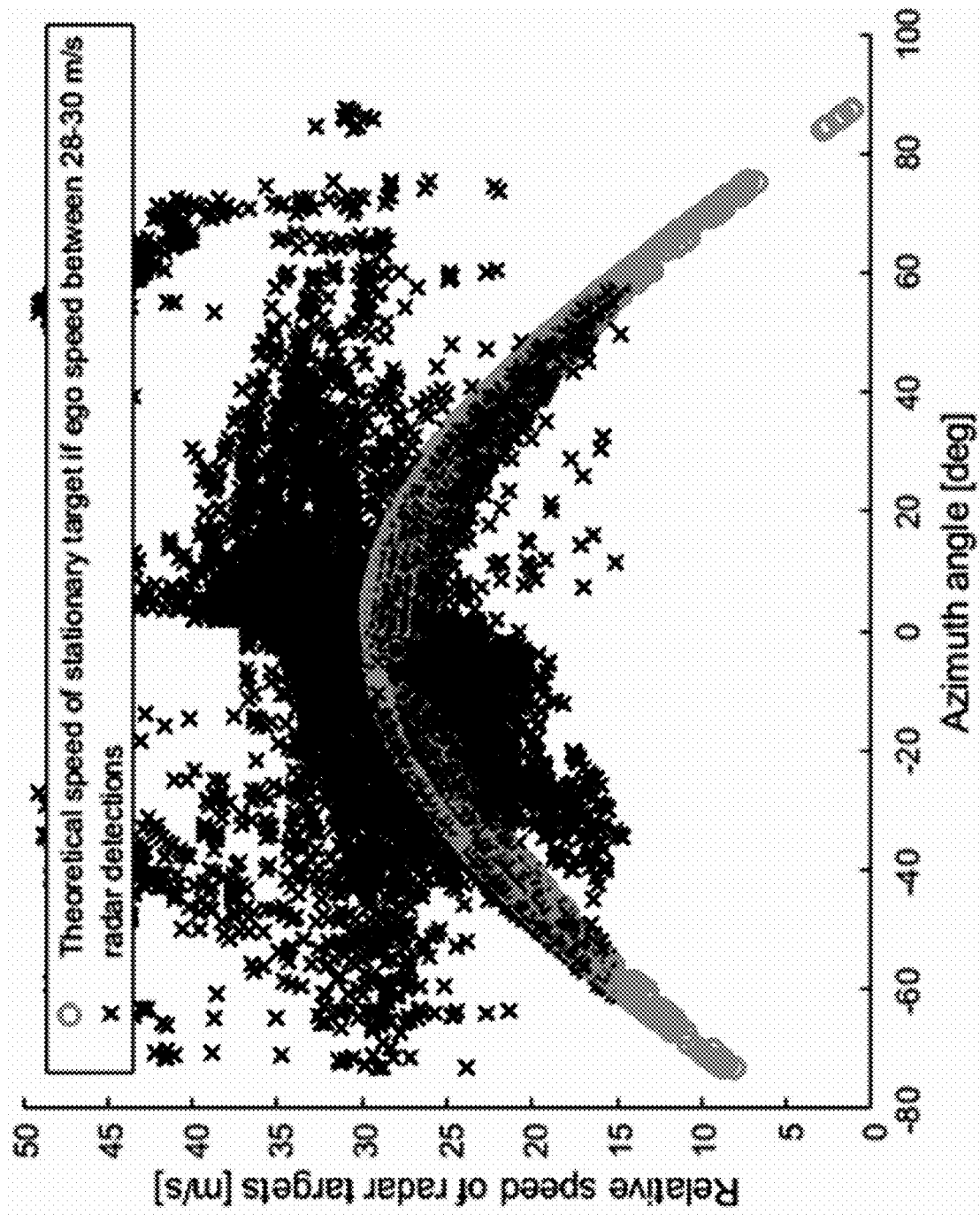
FIG. 6 shows a graph illustrating an example of how the Doppler check may be used on a real-world dataset in a highway scenario.

FIG. 6 shows a graph illustrating an example of how the Doppler check 520 may be used on a real-world dataset in a highway scenario. Here, the graph plots relative speed and azimuth angle of radar targets (each denoted with an "x"), along with theoretical speed of stationary targets (denoted with an "o") for an ego speed within a certain range. Changes in the speed of the radar (e.g., as derived from the vehicle linear and angular velocity measured using IMU or wheel odometry sensors) may result in a corresponding change in the theoretical speed of stationary targets (e.g., a change in the plot of the theoretical speed of stationary targets). According to embodiments, the Doppler check 520 may result in the removal of radar detections from the radar data obtained at block 510 if the radar detections vary from the theoretical speed of stationary targets beyond a threshold amount.

Returning to FIG. 5, the ego speed check 530 may comprise a different type of filtering. As noted, the ego speed check 530 may be complementary to the filtering provided by the Doppler check 520 in that the ego speed check may make the Doppler check more effective. For certain types of radars, there can be ghost targets that always appear at 0 Doppler velocity and thus if the vehicle is moving at small speeds or stationary, it is hard to distinguish these from real static targets. Ego speed check enables radar data being used for further processing only if the ego speed is larger than a threshold (say 0.5 or 1 m/s).

Batch filtering based on a clustering algorithm 550 may be used to further reduce the volume of radar data. As noted, this may be performed in batches (e.g., periodically every 0.5-5 seconds). A clustering algorithm may include DBSCAN, for example. Generally put, batch filtering may comprise batching the radar data in a timeframe with multiple radar reports to a common coordinate frame, using relative pose measurements across time to make the transformation. Outlier points may then be spatially identified and remove, since they are likely false targets. True targets will generally have a small cluster of target points around it.

Figure 7:
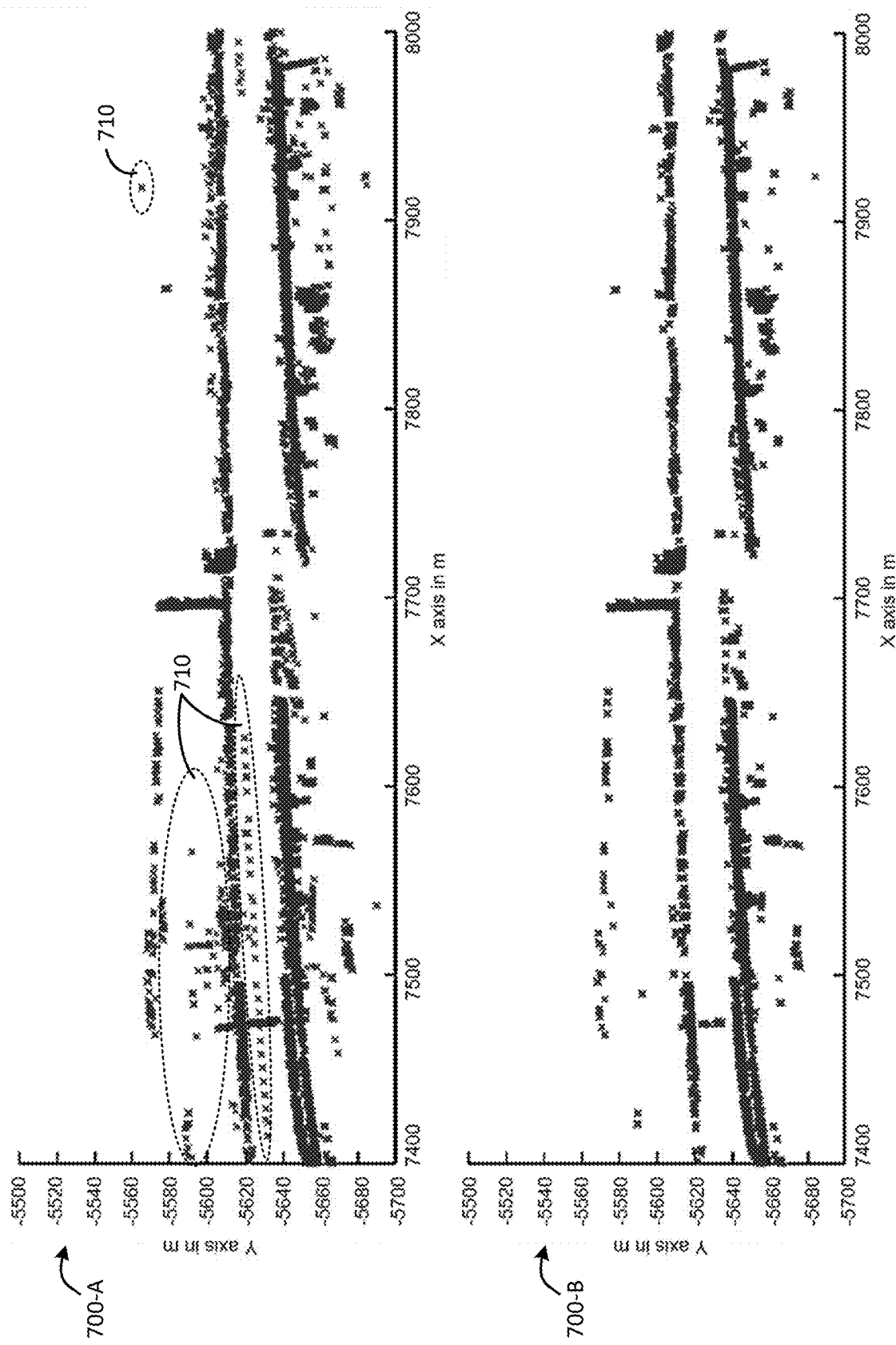
FIG. 7 shows two graphs of radar data, provided to help illustrate how outlier points may be identified and removed in accordance with some embodiments of batch filtering.

FIG. 7 comprises two graphs, 700-A and 700-B, provided to help illustrate how outlier points may be identified and removed in accordance with some embodiments of batch filtering. Each graph plots radar detections accumulated for an example batch (denoted with an "x") along X and Y axes, where the top graph 700-A shows radar data prior to batch filtering, and bottom graph 700-B shows radar data after batch filtering. As can be seen, after a clustering algorithm is performed on the radar data of graph 700-A, many outlier radar detections are identified and removed, including many radar detections in the identified regions 710 of graph 700-A, which are not included in graph 700-B.

Some embodiments may leverage the fact that crowdsourcing occurs at multiple times using multiple vehicles to perform additional filtering. For example, according to some embodiments, each vehicle may conduct random down sampling (e.g., in addition to the filtering shown in the method 500 of FIG. 5) of filtered radar data, by picking up to a maximum number of points. This can help reduce the bandwidth used by each vehicle to upload/publish filtered radar data. However, because down sampling is randomized, data from multiple vehicles will complement each other, providing sufficient radar data to update a radar map layer for an HD map.

As previously noted, if a vehicle determines that detected radar data matches radar data from a downloaded radar map layer (e.g., within a threshold), the vehicle may not publish any radar data. That is, even if a publish flag is ON (e.g., in view of the previously-described factors for determining whether to publish), no additional radar data may be uploaded if the radar data acquired by vehicle already matches the radar data from a radar map layer of an HD map downloaded by the vehicle. Matching may use the map2map or scan2map matching approaches as previously discussed. This determination may be made on a portion of the downloaded radar map layer, such as per tile/subregion, per batch, etc. For example, all batches with good matching performance (e.g., a high value of normalized cross correlation as per map2map matching or a low value of the optimization metric in scan2map matching), can be omitted from data published to the server, whereas the batches with poor matching performance (e.g., below a threshold) can be included. In this way, according to some embodiments, the vehicle may only upload radar data that is different from the radar data of the downloaded radar map layer. In some embodiments, the vehicle may upload an indication that no data is sent with respect to one or more regions within a downloaded radar map layer because data detected by the vehicle in the one or more regions already match the downloaded radar map layer (e.g., within a threshold).

Figure 8:
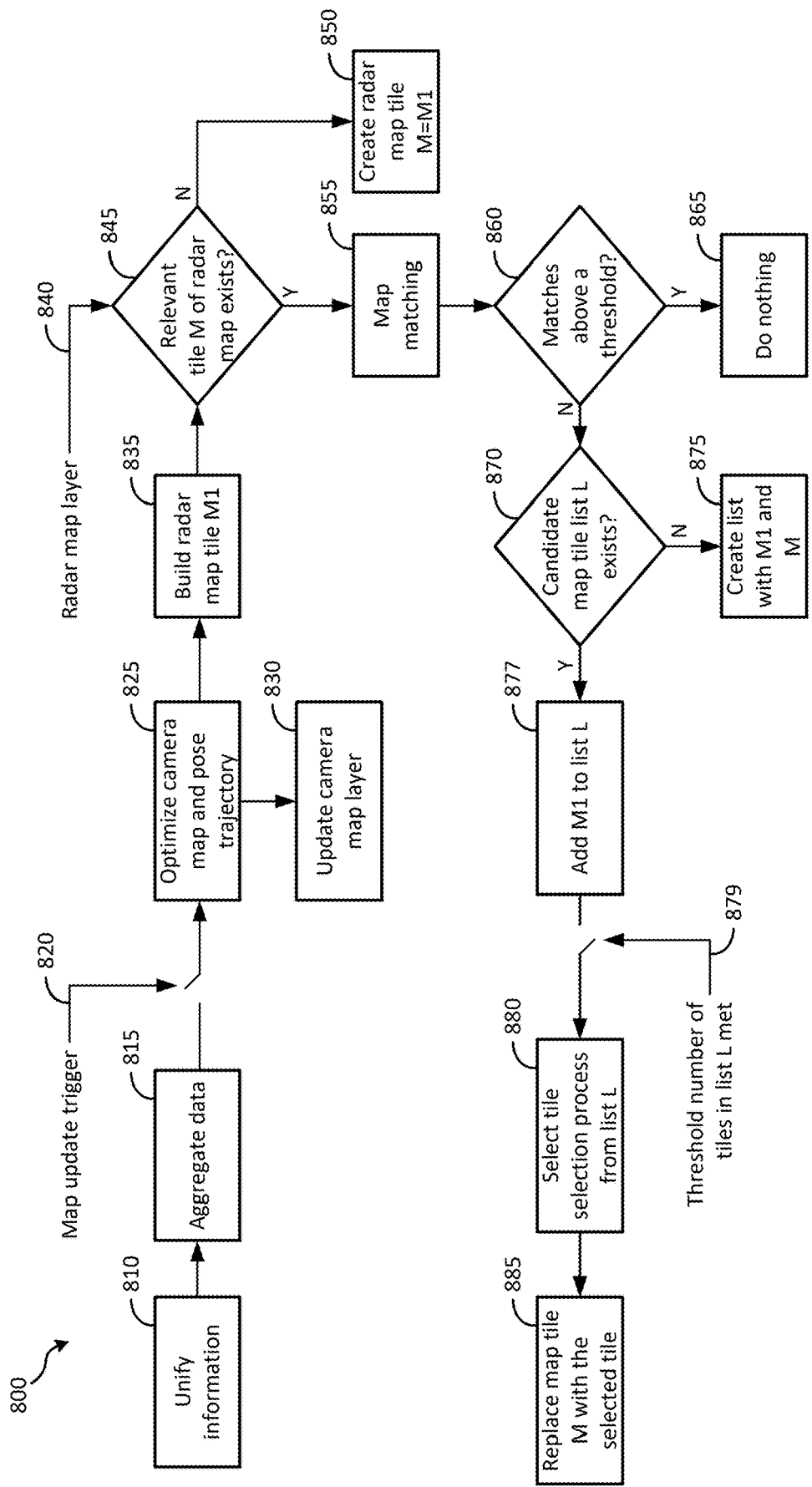
FIG. 8 is a flow diagram illustrating a method of radar map management that may be performed by a server when receiving published radar map layer data from vehicles.

FIG. 8 is a flow diagram 800 illustrating a method of radar map management that may be performed by a server when receiving published radar map layer data from vehicles. The functionality in the diagram 800 therefore may be viewed as a more detailed description of aspects of the functionality in block 310 of FIG. 3, previously described. As with other figures provided herein, FIG. 8 is provided as a nonlimiting example, and alternative embodiments may add, omit, and/or rearrange operations, depending on desired functionality. For example, the flow diagram 800 includes processing camera map layer data in addition to radar map layer data, whereas alternative embodiments process camera and radar map layer data separately.

At block 810, published data uploaded by vehicles is unified. As previously noted (e.g., with regard to block 370 of FIG. 3), data may be unified to a common format and scale, which may vary across vehicles based on sensor type, capabilities, etc. For instance, some vehicles may publish standard deviation of a quantity while others may publish variance. The quality of sensors on different vehicles likely may be different and thus the server may unify the data, in part, by scaling the variance/standard deviation estimates of different quantities like pose, radar data, camera landmarks, etc. so that appropriate weightage is given to data coming from high quality sensors.

At block 815, the unified data may be stored into memory/cache by the server and aggregated over time. As previously noted with regard to FIG. 6, when the map update trigger 820 is ON (or equivalent), the aggregated data may then be used for optimizing the different map layers, and the trajectory of the vehicles that reported the data. As indicated in previously-described embodiments, turning ON of the map update trigger 820 may be periodic or event based. Event-based triggers may include events such as a certain number of reports from vehicles have arrived in a particular region, or multiple vehicles are indicating a change in the environment (e.g., lane closure, construction sign boards added or removed, significant change in parked cars in surroundings, etc.) as perceived by uploaded radar and/or camera map layer data (radar point cloud and/or camera data) in which case it may be desirable to update HD map layers as early as possible.

Once the map update trigger 820 is ON, the functionality at block 825 may be performed, in which camera map and pose trajectory may be optimized (e.g. using an offline SLAM algorithm like graph SLAM). According to some embodiments, the radar data can be used in the pose optimization problem, where a better estimate of reported poses from the vehicles is desired to enable more accurate map generation. The radar data may be used for further improving coverage of the trajectory optimized or as a redundant source of information to make sure any outliers in the trajectory optimization are fixed. More specifically, in some embodiments, radar point cloud or feature data available in cloud/edge are not included as part of the pose optimization problem or the camera map layer optimization problem. In some embodiments, the radar data can also be included as part of the pose optimization to add relative pose constraints using iterative closest point methods to do scan matching across radar point clouds reported for the poses. After the pose optimization, the camera map layer may be updated, as indicated at block 830. In alternative embodiments, additional or alternative map layers (e.g., other HD map layers, excluding the radar map layer) may be optimized in a similar manner.

At block 835, a new radar map tile (M1) is built. According to some embodiments, once an optimized trajectory is obtained, the trajectories may be interpolated to radar measurement timestamps received by the server. Using the pose information obtained in this way, Bayesian SOG map algorithm can be used to generate new radar map tile M1. In particular, this algorithm may be used to construct $p_{ij}$ ($O|z_1$, $z_2$, ..., $z_k$, $\ell_1$, ..., $\ell_N$), which is the conditional probability that the grid cell (i, j) is occupied given all past measurements $z_i$ for i=1, ..., k, which are relative radar detections with respect to pose $\ell_i$ which is obtained from the functionality performed at block 825 (e.g. the graph SLAM optimization).

Figure 9:
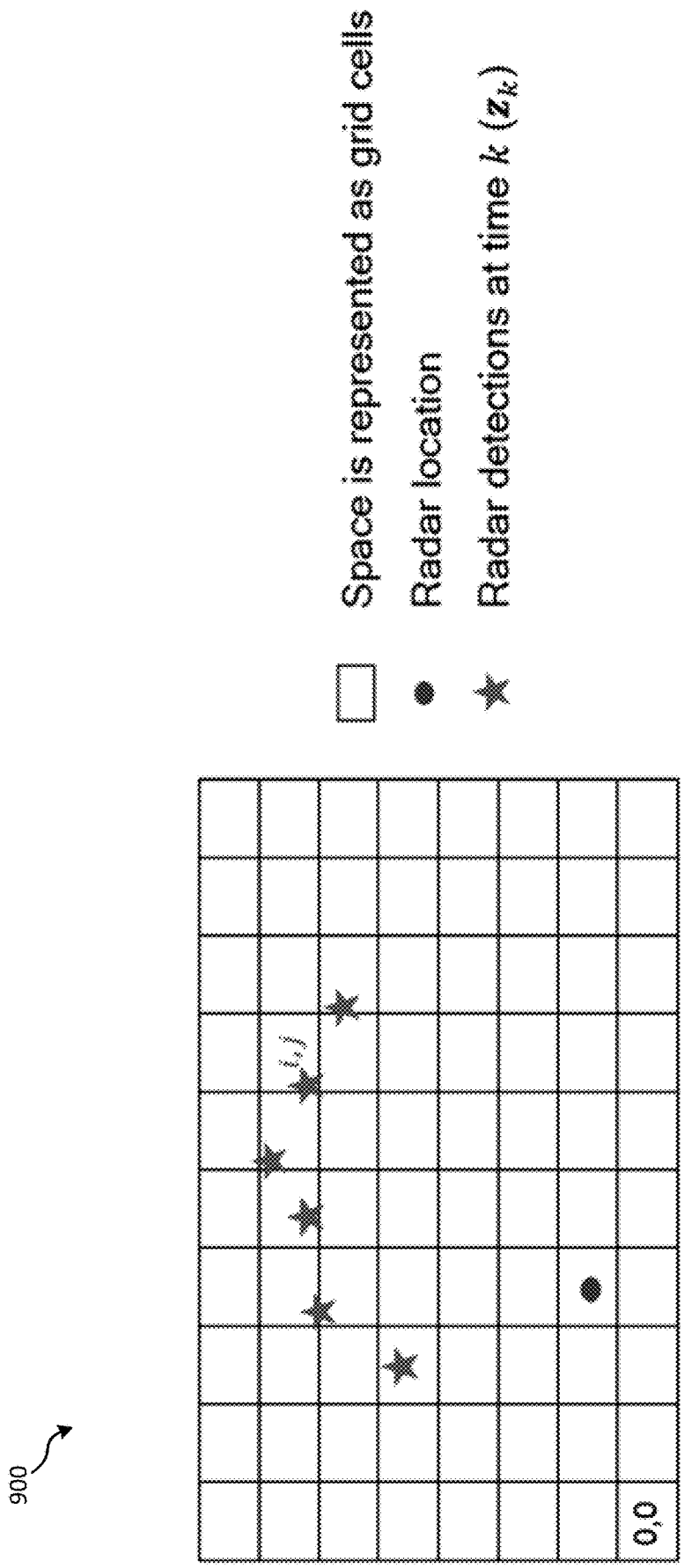
FIG. 9 is a diagram of a 2D grid format that may be used in a radar map layer of an HD map, according to some embodiments.

FIG. 9 is an illustration of a simplified example SOG 900 that may comprise part of a radar map tile and may be obtained using the Bayesian SOG map algorithm. Here, there may be an independence assumption across grid cells (i, j) which implies the occupancy probability of all grid cells in the space is not jointly estimate. It can be shown that, $$p_{ij}(O|z_1, \ldots, z_k, \ell_1, \ldots, \ell_k) = \frac{1}{1 + \exp\left(-l_{ij}^k\right)}, \quad (4)$$

where $$l_{ij}^k = \log \frac{p_{ij}(O|z_k, \ell_k)}{1 - p_{ij}(O|z_k, \ell_k)} - l_{ij}^0 + l_{ij}^{k-1} \quad (5)$$

is the log-likelihood ratio at time k for grid cell (i, j), and $p_{ij}(O|z_k, \ell_k)$ is the inverse sensor model, which models the occupancy probability given only the current set of measurements.

Embodiments may employ different variations of the inverse sensor model. One example is as follows.

$$p_{ij}(O|z_k, \ell_k) = \begin{array}{l} p_{occ}, \text{ at least one } z_k \text{ in neighbourhood } N, \\ p_{prior}, \text{ otherwise.} \end{array} \quad (6)$$

Here, $p_{occ}$ and $p_{prior}$ are fixed scalars indicating occupied probability and prior probability. The neighborhood N could be defined as follows. Assuming perfect pose $\ell_k$, the measurements $z_k$ can be transformed to a global reference frame. If the transformed measurements lie in grid cell (i, j) for example, then all cells in a certain region around (i, j) are neighborhood of the cell. If the vehicles reports error statistics of the radar data (e.g., standard deviation of point target measurements in range and azimuth), and standard deviation in pose $\ell_k$ is also known, then one example implementation may have the neighborhood defined based on these error statistics. For instance, if ($\sigma_z$, $\sigma_\ell$) are standard deviation of measurements in both X and Y dimension of a global frame then the radius of neighborhood N can be $\alpha\sigma_z + \beta\sigma_\ell$ where $\alpha$, $\beta$ are constants.

Different aspects of the radar map tile M may vary, depending on desired functionality. For example, in some embodiments, the tile may have three dimensions. Additionally or alternatively, the resolution of each cell may vary. In some embodiments, each cell may comprise 1-2 m² (or 1-2 m³, for a 3D grid). In some embodiments, grid sizes may be less than 50×50 cm², 10×10 cm², or 3×3 cm², for example, depending on factors such as radar capabilities, radar map layer requirements, etc. In some embodiments, grid cells may be non-square, including rectangular (e.g., having greater width in one dimension than another), hexagonal, etc. According to some embodiments, different radar map layers and/or different tiles within a radar map layer may have different resolutions.

Returning to FIG. 8, once the new radar map tile M1 is built at block 835, additional operations may be performed to determine whether an existing radar layer (represented by arrow 840) should be updated using this information. At block 845, the server determines whether a relevant tile, M, of the radar map layer already exists. If not, the server may perform the functionality at block 850, in which the new radar map tile, M1, built at block 835 is used in the radar map layer as the relevant tile M. If the relevant tile M of the radar map does exist, the server may perform map matching (e.g., map2map matching), as indicated at block 855, to determine how well the new radar map tile M1 matches with the existing radar map tile M. At block 860, the functionality comprises determining whether the new radar map tile M1 matches with relevant tile M above a threshold. If so, there may be no need to update the relevant tile M, and therefore the server may do nothing, as indicated at block 865. If not, the server may use a process of updating/replacing the relevant map tile M by using a candidate map tile list, L.

The process of using a candidate map tile list may begin with the functionality at block 870, in which the server determines whether a candidate map tile list L already exists for relevant tile M. If not, the server can create the list and populate it with new radar map tile M1 and relevant map tile M, as indicated at block 875. If list L already exists, the server can add new radar map tile M1 to list L, as shown at block 877, and select an appropriate tile from list L, as indicated at block 880. According to some embodiments, and as shown by switch 879, a minimum number of entries in the list L may be accumulated prior to tile selection from list L, in which case the process of operations 810-870 may be repeated until this minimum number is met. The tile selection process of block 880 may comprise identifying the best tile from list L. According to some embodiments, this may be done by performing pairwise grid tile registration and create a square symmetric matrix that contains the matching score for each pairwise registration/map2map matching. The matrix can be collapsed to a vector S of scores to each tile. According to some embodiments, collapsing the matrix may be done by performing a row-wise or column-wise summation of matrix M. The server may then choose the tile with best score in S to replace the map tile M from radar map layer in the HD map, as indicated at block 885.

According to some embodiments, a server can adjust batch times of vehicles (e.g., related to the functionality at block 450 of FIG. 4 and algorithm 550 of FIG. 5) based on a determination of whether existing batch times are sufficient to provide good radar map layer data. For example, the server may perform scan2map matching using different batch durations (considering each upload from a vehicle as current batch duration used by a vehicle and increasing the batch durations by aggregating across multiple uploads). If matching performance increases with longer batch durations, for example, the server may notify one or more vehicles that the vehicle batch duration should be increased for improved performance. Depending on desired functionality, this feedback by the server may be provided to multiple vehicles based on a single vehicles' data, and/or customized on a per-vehicle basis based on data received from each vehicle.

Additionally or alternatively, vehicles may communicate with each other regarding batch times. For example, if a vehicle determines batch filtering of radar data of a particular area for a given batch time to be particularly effective (e.g., above a threshold), the vehicle may share this batch time with nearby vehicles (e.g., via vehicle-to-vehicle (V2V) communications).

According to some embodiments, an HD map determined to be accurate (based on one or more different metrics for accuracy) may be used by vehicles to help identify and track dynamic objects. That is, an accurate HD map (e.g., having been updated within a threshold amount of time and/or based on sensor information collected from a threshold number of vehicles) provided by a server may be certified or otherwise flagged by the server to a vehicle as being highly accurate. In such instances, the receiving vehicle can then use the map to (e.g., in addition to performing localization) identify dynamic objects within the map based on differences between the map and sensor data from the vehicle. According to some embodiments, a plurality of HD map layers corresponding sensors at the vehicle may be used to help ensure accurate identification of dynamic objects (and ultimately the proper operation of the vehicle and the safety of vehicle passengers).

Further, depending on desired functionality, the server might be capable of notifying a vehicle if published data looks problematic. That is, according to some embodiments, a server may be capable of identifying data from a single vehicle (e.g., from the data aggregated at block 815). If the server identifies data from a single vehicle as being an outlier (e.g., when compared with data from a plurality of other vehicles), the server may communicate this to the vehicle so that the vehicle can act accordingly (e.g., calibrate sensors, reduce a confidence level of the data, etc.).

Figure 10:
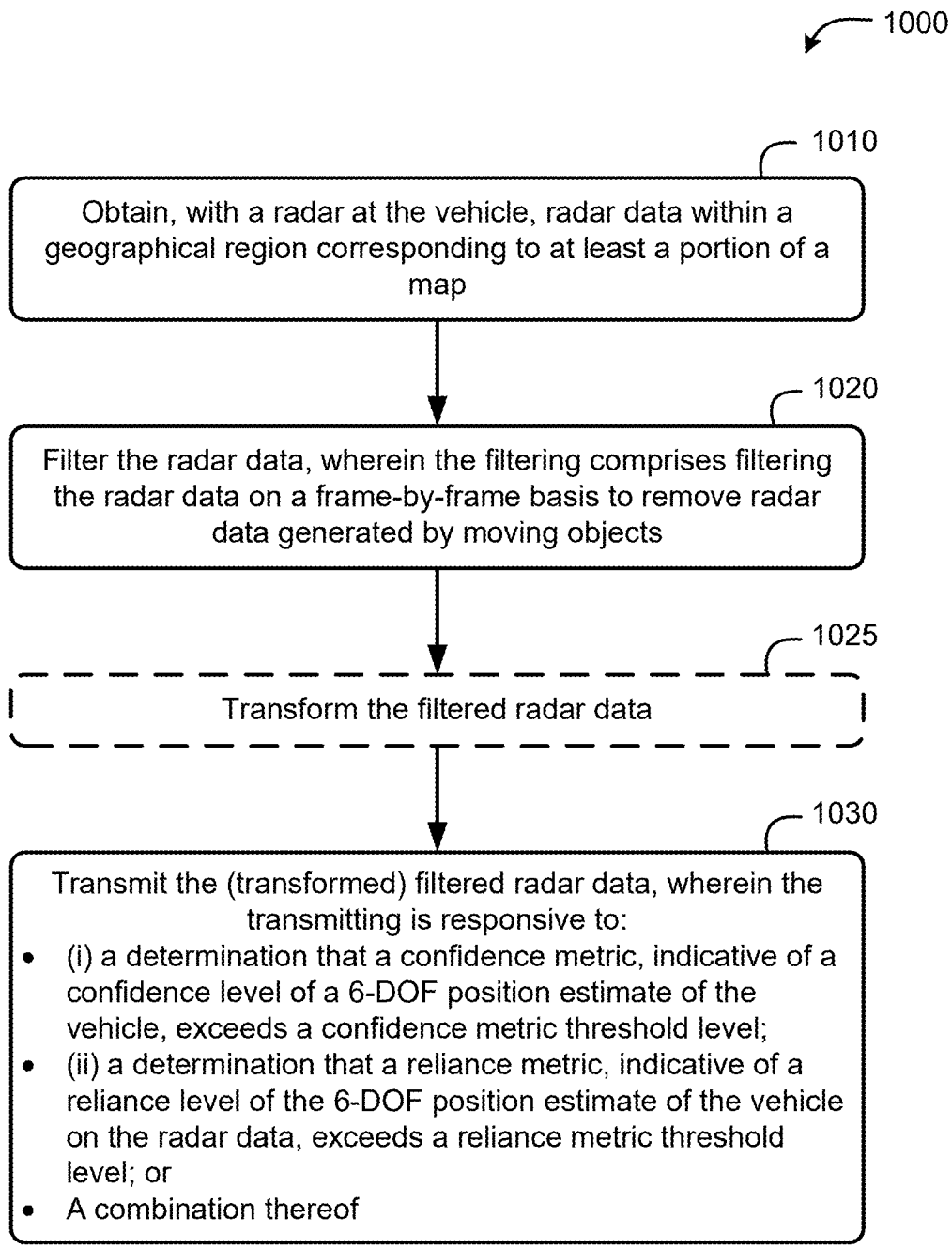
FIG. 10 is a flow diagram of a method of obtaining data at a vehicle for a radar layer of an HD map, according to some embodiments.

FIG. 10 is a flow diagram of a method 1000 of obtaining data at a vehicle for a radar layer of a map (e.g., an HD map or other 3D and/or traffic map), according to an embodiment. Means for performing the functionality illustrated in one or more of the blocks shown in FIG. 10 may be performed by hardware and/or software components of a vehicle or, more generally, a mobile computing system (which may be incorporated into a vehicle). Example components of a mobile computing system are illustrated in FIG. 12, which is described in more detail below.

At block 1010, the functionality comprises obtaining, with a radar at the vehicle, radar data within a geographical region corresponding to at least a portion of the HD map. As indicated in the previously-described embodiments, radar may comprise one or more radar sensors capturing scans, or frames, of regions (areas/volumes) near the vehicle. It can be further noted that embodiments are not limited to a particular form of radar data. For example, radar data may comprise point cloud data, data vectorization, or a combination thereof. As indicated in the above-described embodiments, a vehicle may obtain radar data within the geographical region corresponding to a subregion/tile of the HD map. Radar data may be used, among other things, for position determination of the vehicle and/or localization of the vehicle within the HD map. As noted, obtaining radar data may be responsive to sending an indication to a server of which radar map layer(s) the vehicle can consume and, in return, receiving the relevant HD map layer(s), as described previously with regard to FIG. 3 the radar data as such, embodiments of the method 1000 may further comprise sending a notification from the vehicle to a server, wherein the notification comprises an indication of a location of the vehicle, and a capability of the vehicle for obtaining the radar data. The method may further comprise, subsequent to sending the notification, receiving the radar layer of the HD map at the vehicle from the server. Means for performing functionality at block 1010 may comprise a bus 1205, processor(s) 1210, digital signal processor (DSP) 1220, wireless communication interface, sensors 1240 (including radar 1241), memory 1260, and/or other components of a mobile computing system 1200, as illustrated in FIG. 12.

At block 1020, the functionality comprises filtering the radar data, wherein the filtering comprises filtering the radar data on a frame-by-frame basis to remove radar data generated by moving objects. As discussed, this may be based at least in part on a Doppler velocity measured by the radar, and linear and angular velocities of the vehicle when the radar data was obtained. This functionality may correspond, for example, to the previously-described frame-by-frame filtering of FIG. 5. This may include, for example, comparing the Doppler velocity corresponding to the radar detections (e.g., point targets) with theoretical speed of stationary targets, as previously described with regard to FIG. 6, that is derived using ego linear and angular velocities of the radar deployed on the vehicle. In an embodiment, filtering the radar data on a frame-by-frame basis may comprise identifying the radar data generated by the moving objects using (i) a Doppler velocity measured by the radar and (ii) linear and angular velocities of the vehicle when the radar data was obtained. According to some embodiments, filtering the radar data on a frame-by-frame basis also may be based at least in part on one or more calibration transforms. That is, because the linear and angular velocity may not be measured at the radar frame on vehicle, measuring linear and angular velocity of vehicle may need to be transformed to be at radar frame before using in Doppler filtering. In an embodiment, the method 1000 may further comprise using a calibration transform to transform the linear and angular velocities of the vehicle to a radar frame As noted in the above-described embodiments, filtering the radar data may further comprise filtering a batch of radar data comprising plurality of frames of the radar data. Filtering the batch of radar data may be based on a clustering algorithm, may involve spatially identifying and removing outlier radar detections (e.g., using spatial filtering), and/or may involve performing a matching algorithm to determine a degree of similarity of the batch of radar data with corresponding data from the radar layer, and including the batch of radar data in the filtered radar data responsive to a determination that the degree of similarity of the batch of radar data with the corresponding data from the radar layer is below a threshold level. Additionally or alternatively, filtering the radar data may further comprise performing down sampling of the radar data, where an exemplary down sampling can be random down sampling.

Figure 12:
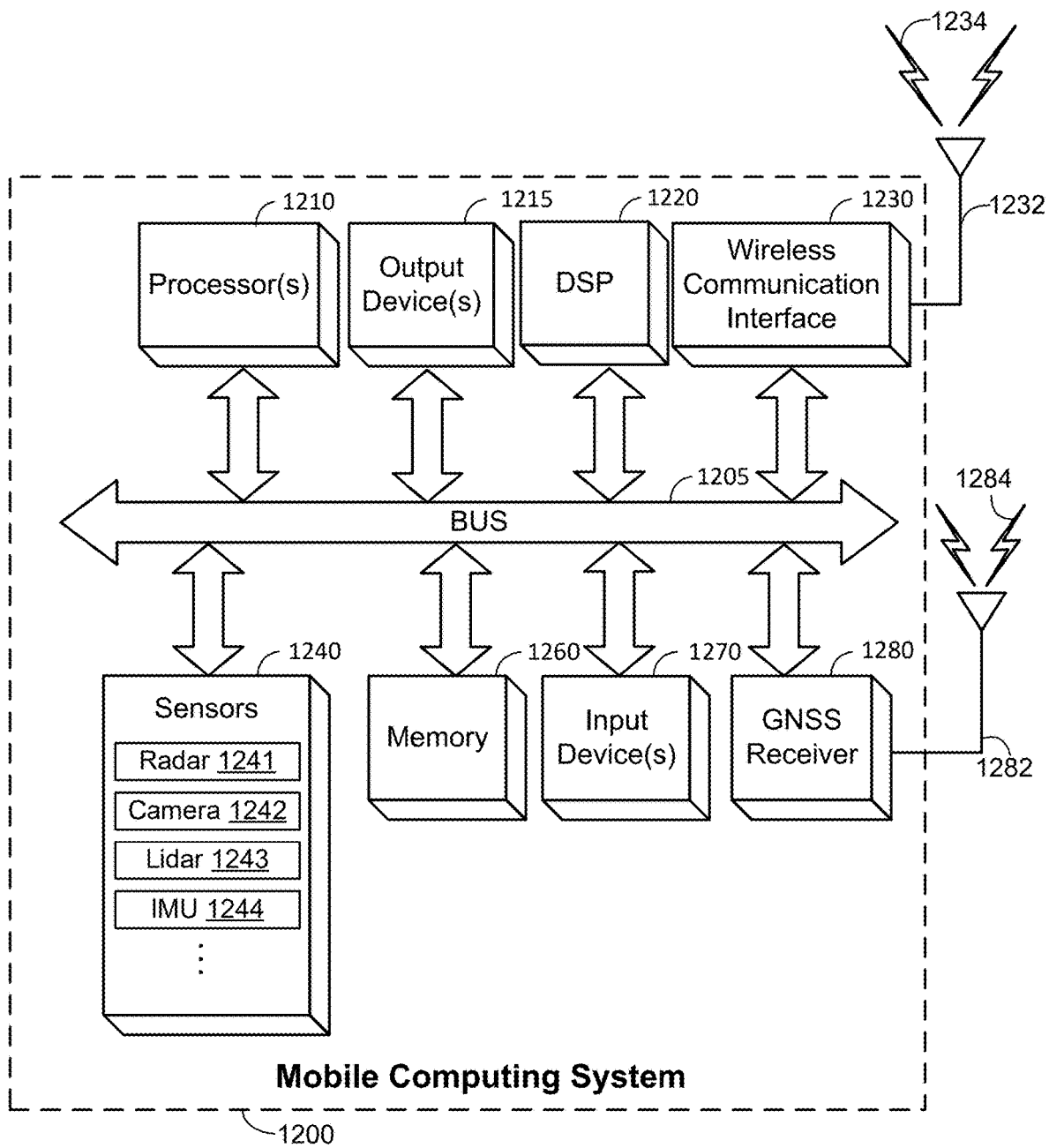
FIG. 12 is a block diagram of an embodiment of a mobile computing system.

Means for performing functionality at block 1020 may comprise a bus 1205, processor(s) 1210, DSP 1220, sensors 1240 (including radar 1241), memory 1260, and/or other components of a mobile computing system 1200, as illustrated in FIG. 12.

The method 1000 may optionally include (as indicated by the dashed lines) the functionality at block 1025, which comprises transforming the filtered radar data. Specifically, radar data (e.g., point cloud data), which may not have any semantic meaning, may be processed to determine features which can have semantic meaning (e.g., curbs, foliage, etc.) and/or geometric meaning (e.g., straight line feature, circular cluster feature, etc.). This functionality may be seen as an optional post processing operation to transform point cloud data to feature-based radar data, where features may have semantic and/or geometric meaning, or could have associated meta information that help server-side processing, such as confidence of detected targets. This meta information associated with the filtered radar data could be transmitted together with or separate from the filtered radar data (e.g., at block 1030, discussed below). Additional or alternative meta information may comprise a matching metric (e.g., a map2map matching score or other metric indicating a degree to which filtered radar data matches reference map radar data), a statistic of radar localization success, or a sensor quality, or any combination thereof.

Means for performing functionality at block 1025 may comprise a bus 1205, processor(s) 1210, DSP 1220, sensors 1240 (including radar 1241), memory 1260, and/or other components of a mobile computing system 1200, as illustrated in FIG. 12.

The functionality at block 1030 comprises transmitting the (optionally transformed) filtered radar data, wherein the transmitting is responsive to a determination that a confidence metric of a 6-DOF position estimate of the vehicle exceeds a confidence metric threshold level, a determination that a reliance of the 6-DOF position estimate of the vehicle on the radar data exceeds a reliance threshold level, or a combination thereof. As previously indicated, the transmitting the filtered radar data may comprise wirelessly transmitting the filtered radar data (e.g., via cellular or other wireless communications). As described in the embodiments above, the determination that the confidence metric of the 6-DOF position estimate of the vehicle exceeds the confidence metric threshold level may be based on a covariance matrix of the 6-DOF position estimate (e.g., each 6-DOF in ego pose state has standard deviation which is less than a particular threshold). According to some embodiments, the determination that the reliance of the 6-DOF position estimate of the vehicle on the radar data exceeds the reliance threshold level may comprise determining the vehicle has entered a predetermined geographical area (e.g., urban canyons and/or other areas/locations where positioning from GNSS and/or other sensors may be adversely affected). According to some embodiments, transmitting the filtered radar data may comprise sending the filtered radar data to a server, another vehicle, or both, to create or update the radar map layer of the map. Some embodiments may further comprise transmitting an indication of the confidence metric of the 6-DOF position estimate of the vehicle Means for performing functionality at block 1030 may comprise a bus 1205, processor (s) 1210, DSP 1220, wireless communication interface, sensors 1240 (including radar 1241), memory 1260, and/or other components of a mobile computing system 1200, as illustrated in FIG. 12.

Figure 11:
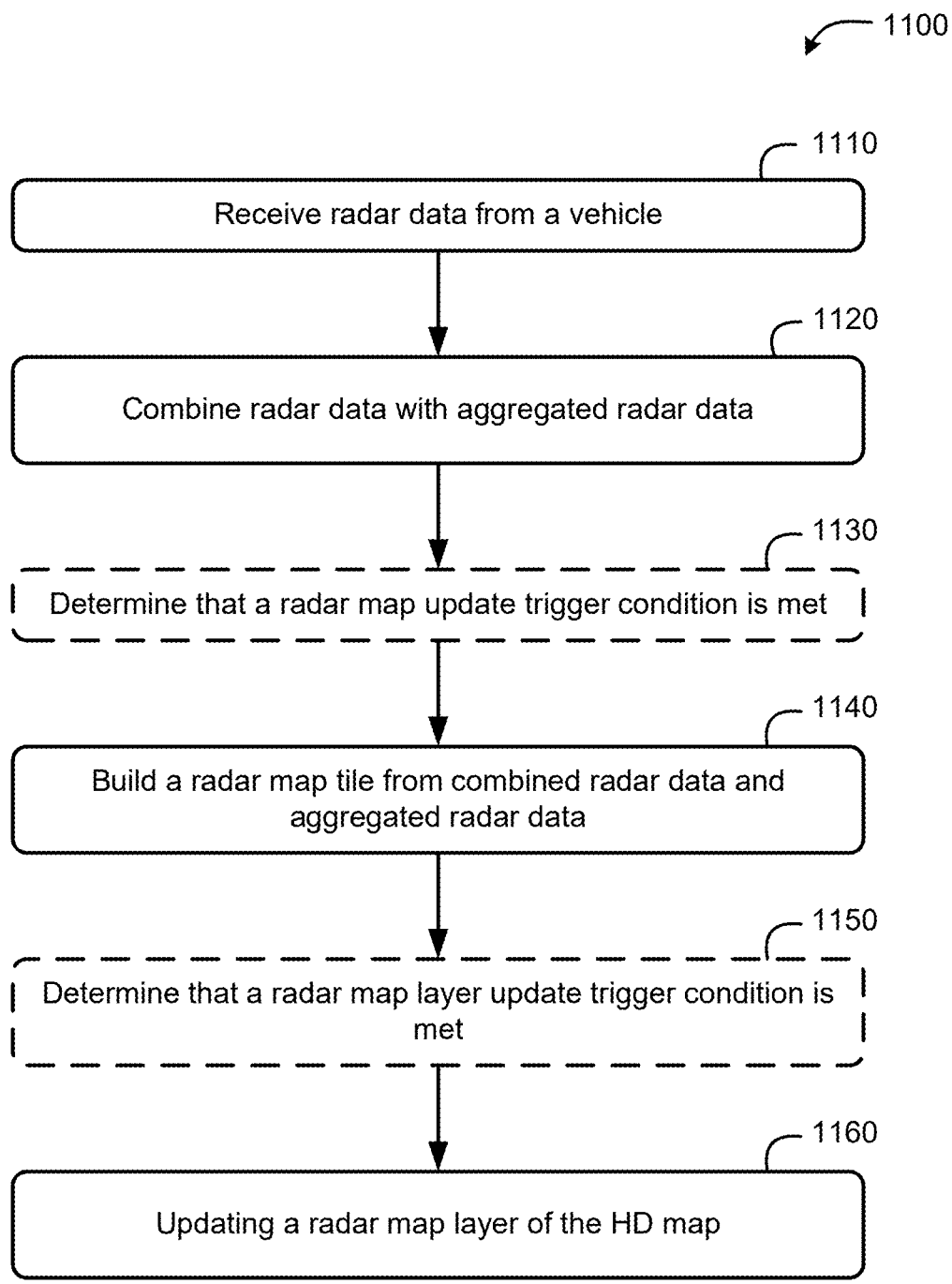
FIG. 11 is a flow diagram of updating a radar layer of an HD map, according to some embodiments.

FIG. 11 is a flow diagram of a method 1100 of updating a radar map layer of an HD map, according to an embodiment in FIG. 11 may be performed by hardware and/or software components of a server or, more generally, a computer system. Example components of a computer system 1300 are illustrated in FIG. 13, which is described in more detail below.

At block 1110, the functionality comprises receiving radar data from a vehicle. As indicated in the previously-described embodiments, receiving the radar data from the vehicle may occur after the computer server initially provides the vehicle with radar data within a geographical region corresponding to at least a portion of the HD map. Providing the radar data may be responsive to a request by the vehicle. Further, the request may indicate that the vehicle can ingest a radar map layer of the HD map. As noted, the vehicle may transmit the radar data responsive to a determination that a confidence of a 6-DOF position estimate of the vehicle exceeds a confidence threshold level, a determination that a reliance of the 6-DOF position estimate of the vehicle on the radar data exceeds a reliance threshold level, or a combination thereof. Moreover, the radar data may comprise radar data obtained by radar of the vehicle that is on a frame-by-frame basis based at least in part on a Doppler velocity measured by the radar, and linear and angular velocities of the vehicle when the radar data was obtained. The radar data may be obtained within the geographical region corresponding to a subregion/tile of the HD map. Radar data may be used, among other things, for position determination of the vehicle and/or localization of the vehicle within the HD map.

The contents of the received radar data (and/or aggregated radar data described hereafter with respect to block 1120) and/or the way in which the radar data is received, may vary, depending on desired functionality. The radar data may be filtered point cloud data, as previously described, and/or may include other types of radar data. In certain implementations or road scenarios, for example, it radar data may include dynamic and/or static obstacle data (in addition or as an alternative to filtered radar data) detected by radar. In some implementations, the radar data received at the server that generates the HD map layer may not directly come directly from the vehicle that collects the radar data, but may come via a backhaul network. This may occur, for example, when the vehicle uploads the data to nearest infrastructure radio head which then transmits the data via wireless and/or wired network means to the server maintaining the HD map. Such data over backhaul network may not be in same format, for example, as radar data received directly from a vehicle (e.g., as previously described with respect to FIG. 10).

Figure 13:
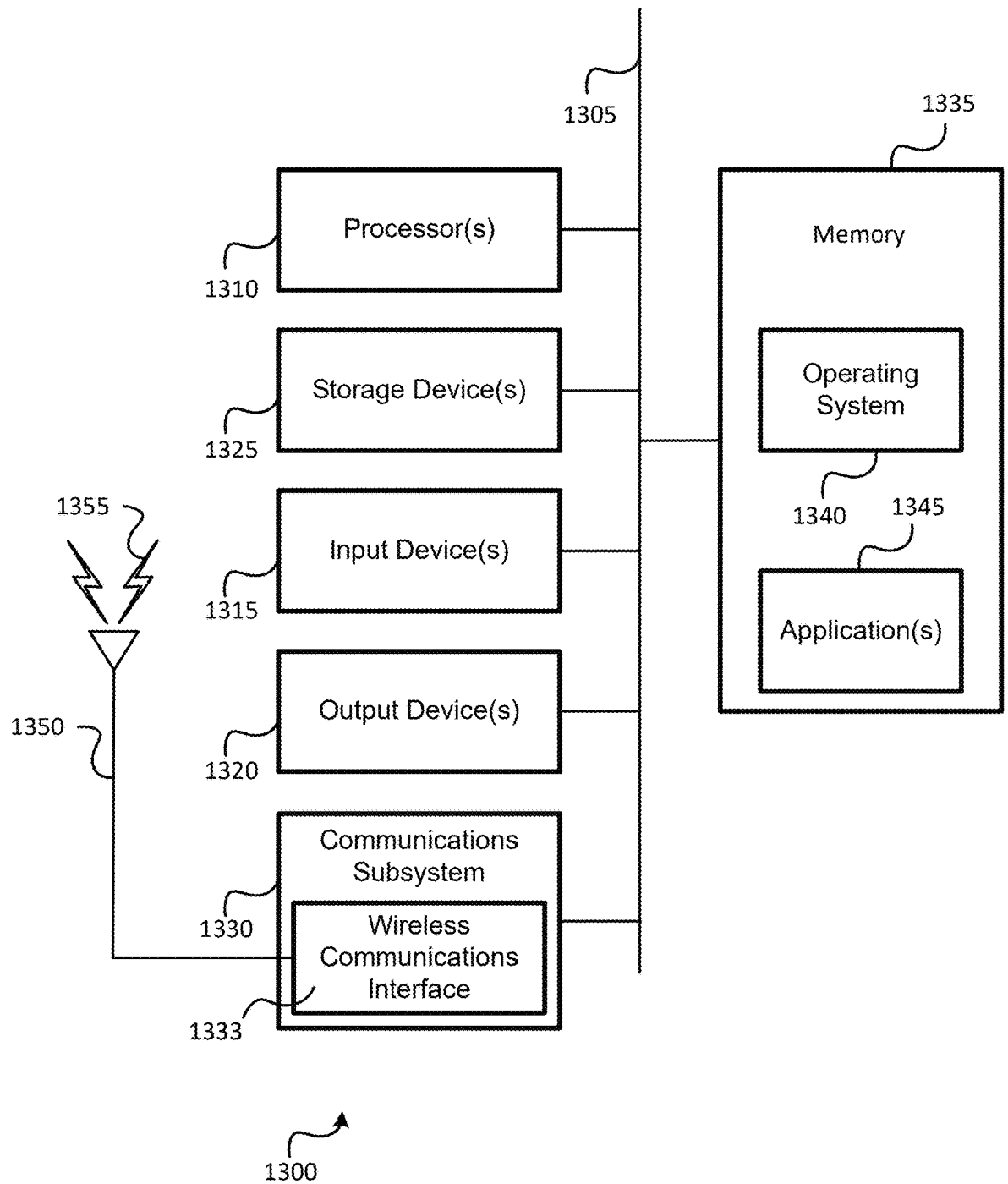
FIG. 13 is a block diagram of an embodiment of a computer system.

Means for performing functionality at block 1110 may comprise a bus 1305, processor(s) 1310, input devices 1315, communications subsystem 1330 (wireless communications interface 1333), memory 1335, and/or other components of a computer system 1300, as illustrated in FIG. 13.

At block 1120, the functionality comprises combining the radar data with aggregated radar data. As previously indicated with respect to FIG. 8, combining radar data from a vehicle with aggregated radar data (e.g., from one or more additional vehicles and/or previously provided by the vehicle) may comprise unifying the radar data. This may comprise, for instance, conforming the received radar data to a particular coordinate system, scale, format, etc., or combination thereof. The radar data may be stored with respect to rear axle frame of ego vehicle along with associated ego pose or it may be stored directly in a fixed reference frame like ECEF, in which case the points are mapped from rear axle frame to ECEF using the ego pose.

Means for performing functionality at block 1120 may comprise a bus 1305, processor(s) 1310, input devices 1315, communications subsystem 1330 (wireless communications interface 1333), memory 1335, and/or other components of a computer system 1300, as illustrated in FIG. 13.

The functionality at block 1130 comprises determining that a radar map update trigger condition is met, which may be optional (as indicated by the dashed lines in FIG. 11). As previously indicated with respect to FIG. 8, when the map update trigger 820 is ON (or equivalent), the aggregated data may then be used for optimizing the different map layers, including the radar map layer, and the trajectory of the vehicles that reported the data. As such, according to some embodiments, if the radar map update trigger condition is met, the computer system may optimize a camera map and pose trajectory and update a camera map layer of the HD map. As noted previously, the radar map update trigger condition may be periodic or event based. Determining an event-based trigger may include, for example, determining a certain number of reports from vehicles have arrived in a particular region, or multiple vehicles (e.g., a threshold number of vehicles) have indicated a change in the environment (e.g., lane closure, construction sign boards added or removed, significant change in parked cars in surroundings, etc.) as perceived by uploaded radar data and/or camera map layer data (radar point cloud and/or camera data).

Means for performing functionality at block 1130 may comprise a bus 1305, processor(s) 1310, input devices 1315, communications subsystem 1330 (wireless communications interface 1333), memory 1335, and/or other components of a computer system 1300, as illustrated in FIG. 13.

The functionality at block 1140 comprises building a radar map tile from combined radar data and aggregated radar data. As indicated previously with regard to FIGS. 8 and 9, pose information can be used to generate a new radar map tile using, for example, a Bayesian SOG map algorithm. The size, shape, number of dimensions (e.g., 2D or 3D), or combination thereof, may vary. This may depend, for example, on HD map requirements, desired functionality, and/or other factors.

Means for performing functionality at block 1140 may comprise a bus 1305, processor(s) 1310, input devices 1315, communications subsystem 1330 (wireless communications interface 1333), memory 1335, and/or other components of a computer system 1300, as illustrated in FIG. 13.

The functionality at block 1150 comprises determining that a radar map layer update trigger condition is met, which may be optional (as indicated by the dashed lines in FIG. 11). As indicated previously with regard to FIGS. 8, this may comprise one or more of a number of conditions. For example, this may comprise determining whether there is an existing corresponding tile in the HD map. If there is, it may further comprise conducting a matching analysis between the existing corresponding tile and the newly-built radar map tile to determine whether a degree of matching between the two tiles is below a threshold. If so, the server may, according to some embodiments, add the newly-built radar map tile to a list of candidates (or create the list if the list does not exist). According to some embodiments, the server may then determine whether there is at least a threshold number of tiles on the list.

Means for performing functionality at block 1150 may comprise a bus 1305, processor(s) 1310, input devices 1315, communications subsystem 1330 (wireless communications interface 1333), memory 1335, and/or other components of a computer system 1300, as illustrated in FIG. 13.

The functionality at block 1160 comprises updating the radar map layer of the HD map. According to some embodiments, this may comprise replacing an existing corresponding tile in the HD map with the newly-built radar map tile. According to some embodiments, if a list of candidate tiles has been made (and, optionally, if the list contains at least a threshold number of candidate tiles), then the server can select a replacement tile from the list, and replace the existing corresponding tile in the HD map with the replacement tile. The selection of the replacement tile may involve a selection process as previously described with regard to block 880 of FIG. 8.

Means for performing functionality at block 1160 may comprise a bus 1305, processor(s) 1310, input devices 1315, communications subsystem 1330 (wireless communications interface 1333), memory 1335, and/or other components of a computer system 1300, as illustrated in FIG. 13.

FIG. 12 is a block diagram of an embodiment of a mobile computing system 1200, which can be incorporated into a vehicle and utilized as described herein above (e.g., in association with FIGS. 1-11) to enable the vehicle to perform the functions of the embodiments described herein. For example, the mobile computing system 1200 can perform one or more of the functions of the method shown in FIG. 10. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 12.

The mobile computing system 1200 is shown comprising hardware elements that can be electrically coupled via a bus 1205 (or may otherwise be in communication, as appropriate), which may include a vehicle-specific bus such as a Controller Area Network (CAN) bus. The hardware elements may include a processor(s) 1210 which can include without limitation one or more general-purpose processors (e.g., an application processor), one or more special-purpose processors (such as DSP chips, graphics acceleration processors, application specific integrated circuits (ASICs), and/or the like), and/or other processing structures or means. Processor(s) 1210 may comprise one or more processing units, which may be housed in a single integrated circuit (IC) or multiple ICs. As shown in FIG. 12, some embodiments may have a separate DSP 1220, depending on desired functionality. Location determination and/or other determinations based on wireless communication may be provided in the processor(s) 1210 and/or wireless communication interface 1230 (discussed below). The mobile computing system 1200 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

The mobile computing system 1200 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile computing system 1200 to communicate with other devices as described in the embodiments above. The wireless communication interface 1230 may permit data and signaling to be communicated (e.g., transmitted and received) with transmission/reception points (TRPs) of a network, for example, via cellular base stations (e.g., eNBs, gNBs, ng-eNBs, etc.), access points, and/or other access node types, and/or other network components, computer systems, and/or any other electronic devices communicatively coupled with TRPs, as described herein. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof. The antenna(s) 1232 may be capable of transmitting and receiving wireless signals using beams (e.g., Tx beams and Rx beams). Beam formation may be performed using digital and/or analog beam formation techniques, with respective digital and/or analog circuitry. The wireless communication interface 1230 may include such circuitry.

Depending on desired functionality, the wireless communication interface 1230 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile computing system 1200 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement Global System for Mobile communications (GSM), Digital Advanced Mobile Phone System (D-AMPS), or some other radio access technology (RAT). An OFDMA network may employ long-term evolution (LTE), LTE Advanced, fifth generation (5G) new radio (NR), and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile computing system 1200 can further include sensors 1240. Sensor(s) 1240 may correspond to sensors 205 of FIG. 2, and may therefore include a radar 1241, camera 1242, and other sensors. As illustrated, sensors 1240 may further comprise lidar 1243, IMU 1244, and more. Sensors 1240 may further comprise accelerometer(s), gyroscope(s), magnetometer(s), altimeter(s), microphone(s), proximity sensor(s), light sensor(s), barometer(s), sonar, and/or sensors from vehicle systems (e.g., wheel sensors, speedometer, etc.). As described herein, sensors may be used to obtain information regarding position and/or movement.

Embodiments of the mobile computing system 1200 may also include a GNSS receiver 1280 (e.g., corresponding to GNSS unit 230 of FIG. 2) capable of receiving signals 1284 from one or more GNSS satellites using an antenna 1282 (which could be the same as antenna 1232). Positioning based on GNSS signal measurement can be utilized to complement and/or incorporate the techniques described herein. The GNSS receiver 1280 can extract a position of the mobile computing system 1200, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1280 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 is illustrated in FIG. 12 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1210, DSP 1220, and/or a processor within the wireless communication interface 1230 (e.g., in a modem).

A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1210 or DSP 1220.

The mobile computing system 1200 may further include and/or be in communication with a memory 1260. The memory 1260 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the mobile computing system 1200 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the mobile computing system 1200 (and/or processor(s) 1210 or DSP 1220 within mobile computing system 1200). In some embodiments, then, such code and/or instructions can be used to configure and/or adapt a general-purpose computer (or other device) to perform one or more operations in accordance with the described methods.

FIG. 13 is a block diagram of an embodiment of a computer system 1300, which may be used, in whole or in part, to provide the functions of a server or other computing device as described in the embodiments herein (e.g., the cloud/edge server described with respect to FIGS. 3-10). It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner. In addition, it can be noted that components illustrated by FIG. 13 can be localized to a single device and/or distributed among various networked devices, which may be disposed at different geographical locations.

The computer system 1300 is shown comprising hardware elements that can be electrically coupled via a bus 1305 (or may otherwise be in communication, as appropriate). The hardware elements may include processor(s) 1310, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1300 also may comprise one or more input devices 1315, which may comprise without limitation a mouse, a keyboard, a camera, a microphone, and/or the like; and one or more output devices 1320, which may comprise without limitation a display device, a printer, and/or the like.

The computer system 1300 may further include (and/or be in communication with) one or more non-transitory storage devices 1325, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1300 may also include a communications subsystem 1330, which may comprise wireless communication technologies managed and controlled by a wireless communication interface 1333, as well as wired technologies (such as Ethernet, coaxial communications, universal serial bus (USB), and the like). The wireless communication interface 1333 may comprise one or more wireless transceivers that may send and receive wireless signals 1355 (e.g., signals according to 5G NR or LTE) via wireless antenna(s) 1350. Thus the communications subsystem 1330 may comprise a modem, a network card (wireless or wired), an infrared communication device, a wireless communication device, and/or a chip set, and/or the like, which may enable the computer system 1300 to communicate on any or all of the communication networks described herein to any device on the respective network, including a User Equipment (UE), base stations and/or other TRPs, and/or any other electronic devices described herein. Hence, the communications subsystem 1330 may be used to receive and send data as described in the embodiments herein.

In many embodiments, the computer system 1300 will further comprise a working memory 1335, which may comprise a RAM or ROM device, as described above. Software elements, shown as being located within the working memory 1335, may comprise an operating system 1340, device drivers, executable libraries, and/or other code, such as one or more applications 1345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1325 described above. In some cases, the storage medium might be incorporated within a computer system, such as computer system 1300. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of obtaining data at a vehicle for a radar layer of a map, the method comprising: obtaining, with a radar at the vehicle, radar data within a geographical region corresponding to at least a portion of the map; filtering the radar data, wherein the filtering comprises filtering the radar data on a frame-by-frame basis to remove radar data generated by moving objects; and selectively transmitting the filtered radar data, wherein the transmitting is responsive to: (i) a determination that a confidence metric, indicative of a confidence level of a 6-DOF position estimate of the vehicle, exceeds a confidence metric threshold level; (ii) a determination that a reliance metric, indicative of a reliance level of the 6-DOF position estimate of the vehicle on the radar data, exceeds a reliance metric threshold level; or a combination thereof.

Clause 2. The method of clause 1, wherein filtering the radar data on a frame-by-frame basis comprises identifying the radar data generated by the moving objects using (i) a Doppler velocity measured by the radar and (ii) linear and angular velocities of the vehicle when the radar data was obtained.

Clause 3. The method of clause 2, further comprising using a calibration transform to transform the linear and angular velocities of the vehicle to a radar frame.

Clause 4. The method of any of clauses 1-3, further comprising, prior to obtaining the radar data: sending a notification from the vehicle to a server, wherein the notification comprises an indication of: a location of the vehicle, and a capability of the vehicle for obtaining the radar data; and subsequent to sending the notification, receiving the radar layer of the map at the vehicle from the server.

Clause 5. The method of any of clauses 1-4, wherein filtering the radar data further comprises filtering a batch of radar data comprising plurality of frames of the radar data.

Clause 6. The method of clause 5, wherein filtering the batch of radar data is based on a clustering algorithm.

Clause 7. The method of any of clauses 5-6, wherein filtering the batch of radar data comprises spatially identifying and removing outlier radar detections.

Clause 8. The method of any of clauses 5-7, wherein filtering the batch of radar data comprises: performing a matching algorithm to determine a degree of similarity of the batch of radar data with corresponding data from the radar layer; and including the batch of radar data in the filtered radar data responsive to a determination that the degree of similarity of the batch of radar data with the corresponding data from the radar layer is below a threshold level.

Clause 9. The method of any of clauses 1-8, wherein filtering the radar data further comprises performing random down sampling of the radar data.

Clause 10. The method of any of clauses 1-9, wherein the determination that the confidence metric of the 6-DOF position estimate of the vehicle exceeds the confidence metric threshold level is based on a covariance matrix of the 6-DOF position estimate.

Clause 11. The method of any of clauses 1-10, wherein the determination that the reliance of the 6-DOF position estimate of the vehicle on the radar data exceeds the reliance threshold level comprises determining the vehicle has entered a predetermined geographical area.

Clause 12. The method of any of clauses 1-11, wherein transmitting the filtered radar data comprises sending the filtered radar data to a server, another vehicle, or both, to create or update the radar map layer of the map.

Clause 13. The method of any of clauses 1-12, further comprising transmitting meta information associated with the filtered radar data, wherein the meta information comprises a matching metric, a statistic of radar localization success, or a sensor quality, or any combination thereof.

Clause 14. The method of any of clauses 1-13, wherein the radar data comprises point cloud data, data vectorization, or a combination thereof.

Clause 15. The method of any of clauses 1-14, further comprising transmitting an indication of the confidence of the 6-DOF position estimate of the vehicle.

Clause 16. The method of any of clauses 1-15, wherein the map comprises a high definition (HD) map.

Clause 17. A radar unit for obtaining data at a vehicle for a radar layer of a map, the radar unit comprising: a radar; a memory; and one or more processors communicatively coupled with the radar and the memory, wherein the one or more processors are configured to: obtain, using the radar, radar data within a geographical region corresponding to at least a portion of the map; filter the radar data, wherein the filtering comprises filtering the radar data on a frame-by-frame basis to remove radar data generated by moving objects; and selectively transmit the filtered radar data, wherein the transmitting is responsive to: (i) a determination that a confidence metric, indicative of a confidence level of a 6-DOF position estimate of the vehicle, exceeds a confidence metric threshold level; (ii) a determination that a reliance metric, indicative of a reliance level of the 6-DOF position estimate of the vehicle on the radar data, exceeds a reliance metric threshold level; or a combination thereof.

Clause 18. The radar unit of clause 17, wherein, to filter the radar data on a frame-by-frame basis, the one or more processors are further configured to identify the radar data generated by the moving objects using (i) a Doppler velocity measured by the radar and (ii) linear and angular velocities of the vehicle when the radar data was obtained.

Clause 19. The radar unit of clause 18, wherein, to filter the radar data on a frame-by-frame basis, the one or more processors are further configured to use a calibration transform to transform the linear and angular velocities of the vehicle to a radar frame.

Clause 20. The radar unit of any of clauses 17-19, wherein the one or more processors are further configured to, prior to obtaining the radar data: send a notification from the vehicle to a server, wherein the notification comprises an indication of: a location of the vehicle, and a capability of the vehicle for obtaining the radar data; and subsequent to sending the notification, receive the radar layer of the map at the vehicle from the server.

Clause 21. The radar unit of any of clauses 17-20, wherein, to filter the radar data, the one or more processors are configured to filter a batch of radar data comprising plurality of frames of the radar data.

Clause 22. The radar unit of clause 21, wherein the one or more processors are configured to filter the batch of radar data based on a clustering algorithm.

Clause 23. The radar unit of any of clauses 21-22, wherein, to filter the batch of radar data, the one or more processors are configured to spatially identify and removing outlier radar detections.

Clause 24. The radar unit of any of clauses 21-23, wherein, to filter the batch of radar data, the one or more processors are configured to: perform a matching algorithm to determine a degree of similarity of the batch of radar data with corresponding data from the radar layer; and include the batch of radar data in the filtered radar data responsive to a determination that the degree of similarity of the batch of radar data with the corresponding data from the radar layer is below a threshold level.

Clause 25. The radar unit of any of clauses 17-24, wherein, to filter the radar data, the one or more processors are configured to perform random down sampling of the radar data.

Clause 26. The radar unit of any of clauses 17-25, wherein the one or more processors are configured to determine that the confidence metric of the 6-DOF position estimate of the vehicle exceeds the confidence metric threshold level based on a covariance matrix of the 6-DOF position estimate.

Clause 27. The radar unit of any of clauses 17-26, wherein, to determine that the reliance of the 6-DOF position estimate of the vehicle on the radar data exceeds the reliance threshold level, the one or more processors are configured to determine the vehicle has entered a predetermined geographical area.

Clause 28. The radar unit of any of clauses 17-27, wherein, to transmit the filtered radar data, the one or more processors are configured to send the filtered radar data to a server, another vehicle, or both.

Clause 29. The radar unit of any of clauses 17-28, wherein the one or more processors are further configured to transmit meta information associated with the filtered radar data, wherein the meta information comprises a matching score, a statistic of radar localization success, or a sensor quality, or any combination thereof.

Clause 30. The radar unit of any of clauses 17-29, wherein, to obtain the radar data, the one or more processors are configured to obtain point cloud data, data vectorization, or a combination thereof.

Clause 31. The radar unit of any of clauses 17-30, wherein the one or more processors are further configured to transmit an indication of the confidence of the 6-DOF position estimate of the vehicle.

Clause 32. An apparatus for obtaining data at a vehicle for a radar layer of a map, the apparatus comprising: means for obtaining, at the vehicle, radar data within a geographical region corresponding to at least a portion of the map; means for filtering the radar data, wherein the filtering comprises filtering the radar data on a frame-by-frame basis to remove radar data generated by moving objects; and means for selectively transmitting the filtered radar data, wherein the transmitting is responsive to: (i) a determination that a confidence metric, indicative of a confidence level of a 6-DOF position estimate of the vehicle, exceeds a confidence metric threshold level; (ii) a determination that a reliance metric, indicative of a reliance level of the 6-DOF position estimate of the vehicle on the radar data, exceeds a reliance metric threshold level; or a combination thereof.

Clause 33. The apparatus of clause 32, wherein the means for filtering the radar data on a frame-by-frame basis comprise means for identifying the radar data generated by the moving objects using (i) a Doppler velocity measured by the radar and (ii) linear and angular velocities of the vehicle when the radar data was obtained.

Clause 34. The apparatus of clause 33, wherein the means for filtering the radar data on a frame-by-frame basis comprise means for using a calibration transform to transform the linear and angular velocities of the vehicle to a radar frame.

Clause 35. The apparatus of any of clauses 32-34, further comprising: means for sending, prior to obtaining the radar data, a notification from the vehicle to a server, wherein the notification comprises an indication of: a location of the vehicle, and a capability of the vehicle for obtaining the radar data; and means for receiving, subsequent to sending the notification and prior to obtaining the radar data, the radar layer of the map at the vehicle from the server.

Clause 36. The apparatus of any of clauses 32-35, wherein the means for filtering the radar data further comprises means for filtering a batch of radar data comprising plurality of frames of the radar data.

Clause 37. The apparatus of clause 36, wherein the means for filtering the radar data further comprises means for performing random down sampling of the radar data.

Clause 38. The apparatus of any of clauses 36-37, further comprising means for determining the vehicle has entered a predetermined geographical area.

Clause 39. The apparatus of any of clauses 36-38, wherein the means for transmitting the filtered radar data comprises means for sending the filtered radar data to a server, another vehicle, or both.

Clause 40. The apparatus of any of clauses 32-39, further comprising means for transmitting meta information associated with the filtered radar data, wherein the meta information comprises a matching score, a statistic of radar localization success, or a sensor quality, or any combination thereof.

Clause 41. The apparatus of any of clauses 32-40, further comprising means for transmitting an indication of the confidence of the 6-DOF position estimate of the vehicle.

Clause 42. A non-transitory computer-readable medium storing instructions for obtaining data at a vehicle for a radar layer of an map, the instructions comprising code for: obtaining, with a radar at the vehicle, radar data within a geographical region corresponding to at least a portion of the map; filtering the radar data, wherein the filtering comprises filtering the radar data on a frame-by-frame basis to remove radar data generated by moving objects; and selectively transmitting the filtered radar data, wherein the transmitting is responsive to: (i) a determination that a confidence metric, indicative of a confidence level of a 6-DOF position estimate of the vehicle, exceeds a confidence metric threshold level; (ii) a determination that a reliance metric, indicative of a reliance level of the 6-DOF position estimate of the vehicle on the radar data, exceeds a reliance metric threshold level; or a combination thereof.

Clause 43. The computer-readable medium of clause 42, wherein the instructions further comprise code for, prior to obtaining the radar data: sending a notification from the vehicle to a server, wherein the notification comprises an indication of: a location of the vehicle, and a capability of the vehicle for obtaining the radar data; and subsequent to sending the notification, receiving the radar layer of the map at the vehicle from the server.

Clause 44. The computer-readable medium of any of clauses 42-43, wherein the code for filtering the radar data comprises code for filtering a batch of radar data comprising plurality of frames of the radar data.

What is claimed is:

1. A method of obtaining data at a vehicle for a radar layer of a map, the method comprising:
    obtaining, with a radar at the vehicle, radar data within a geographical region corresponding to at least a portion of the map, the radar data comprising a plurality of frames;
    filtering the radar data to remove data generated by moving objects, wherein filtering the radar data comprises identifying, on a per-frame basis, the data generated by the moving objects using:
        a Doppler velocity measured by the radar, and
        linear and angular velocities of the vehicle when the radar data was obtained, the linear and angular velocities based on vehicle speed determined from a non-radar source; and
    selectively transmitting the filtered radar data from the vehicle to at least one device, wherein the transmitting is responsive to:
        (i) a determination that a confidence metric, indicative of a confidence level of a 6-DOF position estimate of the vehicle, exceeds a confidence metric threshold level;
        (ii) a determination that a reliance metric, indicative of a reliance level of the 6-DOF position estimate of the vehicle on the radar data, exceeds a reliance metric threshold level; or
        a combination thereof.

2. The method of claim 1, further comprising using a calibration transform to transform the linear and angular velocities of the vehicle to a radar frame.

3. The method of claim 1, further comprising, prior to obtaining the radar data:
    sending a notification from the vehicle to a server, wherein the notification comprises an indication of:
        a location of the vehicle, and
        a capability of the vehicle for obtaining the radar data; and
    subsequent to sending the notification, receiving the radar layer of the map at the vehicle from the server.

4. The method of claim 1, wherein filtering the radar data further comprises filtering a batch of radar data comprising plurality of frames of the radar data.

5. The method of claim 4, wherein filtering the batch of radar data is based on a clustering algorithm.

6. The method of claim 4, wherein filtering the batch of radar data comprises spatially identifying and removing outlier radar detections.

7. The method of claim 4, wherein filtering the batch of radar data comprises:
    performing a matching algorithm to determine a degree of similarity of the batch of radar data with corresponding data from the radar layer; and
    including the batch of radar data in the filtered radar data responsive to a determination that the degree of similarity of the batch of radar data with the corresponding data from the radar layer is below a threshold level.

8. The method of claim 1, wherein filtering the radar data further comprises performing random down sampling of the radar data.

9. The method of claim 1, wherein the determination that the confidence metric of the 6-DOF position estimate of the vehicle exceeds the confidence metric threshold level is based on a covariance matrix of the 6-DOF position estimate.

10. The method of claim 1, wherein the determination that the reliance of the 6-DOF position estimate of the vehicle on the radar data exceeds the reliance threshold level comprises determining the vehicle has entered a predetermined geographical area.

11. The method of claim 1, wherein the at least one device comprises a server, another vehicle, or both.

12. The method of claim 1, further comprising transmitting meta information associated with the filtered radar data, wherein the meta information comprises a matching metric, a statistic of radar localization success, or a sensor quality, or any combination thereof.

13. The method of claim 1, wherein the radar data comprises point cloud data, data vectorization, or a combination thereof.

14. The method of claim 1, further comprising transmitting an indication of the confidence of the 6-DOF position estimate of the vehicle.

15. The method of claim 1, wherein the map comprises a high definition (HD) map.

16. A radar unit for obtaining data at a vehicle for a radar layer of a map, the radar unit comprising:
a radar;
a memory and
one or more processors communicatively coupled with the radar and the memory, wherein the one or more processors are configured to:
obtain, using the radar, radar data within a geographical region corresponding to at least a portion of the map, the radar data comprising a plurality of frames;
filtering the radar data to remove data generated by moving objects, wherein filtering the radar data comprises identifying, on a per-frame basis, the data generated by the moving objects using:
a Doppler velocity measured by the radar, and
linear and angular velocities of the vehicle when the radar data was obtained, the linear and angular velocities based on vehicle speed determined from a non-radar source; and
selectively transmit the filtered radar data from the vehicle to at least one device, wherein the transmitting is responsive to:
(i) a determination that a confidence metric, indicative of a confidence level of a 6-DOF position estimate of the vehicle, exceeds a confidence metric threshold level;
(ii) a determination that a reliance metric, indicative of a reliance level of the 6-DOF position estimate of the vehicle on the radar data, exceeds a reliance metric threshold level; or
a combination thereof.

17. The radar unit of claim 16, wherein, to filter the radar data on a frame-by-frame basis, the one or more processors are further configured to use a calibration transform to transform the linear and angular velocities of the vehicle to a radar frame.

18. The radar unit of claim 16, wherein the one or more processors are further configured to, prior to obtaining the radar data:
send a notification from the vehicle to a server, wherein the notification comprises an indication of:
a location of the vehicle, and
a capability of the vehicle for obtaining the radar data; and
subsequent to sending the notification, receive the radar layer of the map at the vehicle from the server.

19. The radar unit of claim 16, wherein, to filter the radar data, the one or more processors are configured to filter a batch of radar data comprising plurality of frames of the radar data.

20. The radar unit of claim 19, wherein the one or more processors are configured to filter the batch of radar data based on a clustering algorithm.

21. The radar unit of claim 19, wherein, to filter the batch of radar data, the one or more processors are configured to spatially identify and remove outlier radar detections.

22. The radar unit of claim 19, wherein, to filter the batch of radar data, the one or more processors are configured to:
perform a matching algorithm to determine a degree of similarity of the batch of radar data with corresponding data from the radar layer; and
include the batch of radar data in the filtered radar data responsive to a determination that the degree of similarity of the batch of radar data with the corresponding data from the radar layer is below a threshold level.

23. The radar unit of claim 16, wherein, to filter the radar data, the one or more processors are configured to perform random down sampling of the radar data.

24. The radar unit of claim 16, wherein the one or more processors are configured to determine that the confidence metric of the 6-DOF position estimate of the vehicle exceeds the confidence metric threshold level based on a covariance matrix of the 6-DOF position estimate.

25. The radar unit of claim 16, wherein, to determine that the reliance of the 6-DOF position estimate of the vehicle on the radar data exceeds the reliance threshold level, the one or more processors are configured to determine the vehicle has entered a predetermined geographical area.

26. The radar unit of claim 16, wherein, to transmit the filtered radar data to the at least one device, the one or more processors are configured to send the filtered radar data to a server, another vehicle, or both.

27. The radar unit of claim 16, wherein the one or more processors are further configured to transmit meta information associated with the filtered radar data, wherein the meta information comprises a matching score, a statistic of radar localization success, or a sensor quality, or any combination thereof.

28. The radar unit of claim 16, wherein, to obtain the radar data, the one or more processors are configured to obtain point cloud data, data vectorization, or a combination thereof.

29. The radar unit of claim 16, wherein the one or more processors are further configured to transmit an indication of the confidence of the 6-DOF position estimate of the vehicle.

30. An apparatus for obtaining data at a vehicle for a radar layer of a map, the apparatus comprising:
means for obtaining, at the vehicle, radar data within a geographical region corresponding to at least a portion of the map, the radar data comprising a plurality of frames;
means for filtering the radar data to remove data generated by moving objects, wherein filtering the radar data comprises identifying, on a per-frame basis, the data generated by the moving objects using:

a Doppler velocity measured by the radar, and
linear and angular velocities of the vehicle when the radar data was obtained, the linear and angular velocities based on vehicle speed determined from a non-radar source; and means for selectively transmitting the filtered radar data from the vehicle to at least one device, wherein the transmitting is responsive to:
  (i) a determination that a confidence metric, indicative of a confidence level of a 6-DOF position estimate of the vehicle, exceeds a confidence metric threshold level;
  (ii) a determination that a reliance metric, indicative of a reliance level of the 6-DOF position estimate of the vehicle on the radar data, exceeds a reliance metric threshold level; or
  a combination thereof.

31. The apparatus of claim 30, wherein the means for filtering the radar data on a frame-by-frame basis comprise means for using a calibration transform to transform the linear and angular velocities of the vehicle to a radar frame.

32. The apparatus of claim 30, further comprising:
means for sending, prior to obtaining the radar data, a notification from the vehicle to a server, wherein the notification comprises an indication of:
  a location of the vehicle, and
  a capability of the vehicle for obtaining the radar data; and
means for receiving, subsequent to sending the notification and prior to obtaining the radar data, the radar layer of the map at the vehicle from the server.

33. The apparatus of claim 30, wherein the means for filtering the radar data further comprises means for filtering a batch of radar data comprising plurality of frames of the radar data.

34. The apparatus of claim 30, wherein the means for filtering the radar data further comprises means for performing random down sampling of the radar data.

35. The apparatus of claim 30, further comprising means for determining the vehicle has entered a predetermined geographical area.

36. The apparatus of claim 30, wherein the means for selectively transmitting the filtered radar data to the at least one device comprises means for sending the filtered radar data to a server, another vehicle, or both.

37. The apparatus of claim 30, further comprising means for transmitting meta information associated with the filtered radar data, wherein the meta information comprises a matching score, a statistic of radar localization success, or a sensor quality, or any combination thereof.

38. The apparatus of claim 30, further comprising means for transmitting an indication of the confidence of the 6-DOF position estimate of the vehicle.

39. A non-transitory computer-readable medium storing instructions for obtaining data at a vehicle for a radar layer of an map, the instructions comprising code for:
obtaining, with a radar at the vehicle, radar data within a geographical region corresponding to at least a portion of the map, the radar data comprising a plurality of frames;
filtering the radar data to remove data generated by moving objects, wherein filtering the radar data comprises identifying, on a per-frame basis, the data generated by the moving objects using:
  a Doppler velocity measured by the radar, and linear and angular velocities of the vehicle when the radar data was obtained, the linear and angular velocities based on vehicle speed determined from a non-radar source; and
selectively transmitting the filtered radar data from the vehicle to at least one device, wherein the transmitting is responsive to:
  (i) a determination that a confidence metric, indicative of a confidence level of a 6-DOF position estimate of the vehicle, exceeds a confidence metric threshold level;
  (ii) a determination that a reliance metric, indicative of a reliance level of the 6-DOF position estimate of the vehicle on the radar data, exceeds a reliance metric threshold level; or
  a combination thereof.

40. The computer-readable medium of claim 39, wherein the instructions further comprise code for, prior to obtaining the radar data:
sending a notification from the vehicle to a server, wherein the notification comprises an indication of:
  a location of the vehicle, and
  a capability of the vehicle for obtaining the radar data; and
subsequent to sending the notification, receiving the radar layer of the map at the vehicle from the server.

41. The computer-readable medium of claim 39, wherein the code for filtering the radar data comprises code for filtering a batch of radar data comprising plurality of frames of the radar data.

* * * * *